United States Patent [19]

Okamoto

[11] Patent Number: 5,404,558

[45] Date of Patent: Apr. 4, 1995

[54] DATA DRIVEN TYPE INFORMATION PROCESSOR HAVING A PLURALITY OF MEMORY BANKS

[75] Inventor: Toshiya Okamoto, Souraku, Japan

[73] Assignee: Sharp Kabushiki Kaisha, Osaka, Japan

[21] Appl. No.: 18,706

[22] Filed: Feb. 17, 1993

[30] Foreign Application Priority Data

Feb. 17, 1992 [JP] Japan .................................. 4-029397
Jul. 7, 1992 [JP] Japan .................................. 4-180128

[51] Int. Cl.⁶ ........................... G06F 9/00; G06F 9/38
[52] U.S. Cl. ............................... 395/800; 364/232.22; 364/DIG. 1
[58] Field of Search .............. 395/800, 425; 370/94.1, 370/85.6

[56] References Cited

U.S. PATENT DOCUMENTS

| | | | |
|---|---|---|---|
| 5,093,919 | 3/1992 | Yoshida et al. | 395/800 |
| 5,117,499 | 5/1992 | Miyata | 395/800 |
| 5,125,097 | 6/1992 | Okamoto et al. | 395/800 |
| 5,165,036 | 11/1992 | Miyata et al. | 395/800 |
| 5,241,683 | 8/1993 | Okamoto | 395/800 |
| 5,257,392 | 10/1993 | Okamoto | 395/800 |

FOREIGN PATENT DOCUMENTS 3127289 10/1989 Japan .
3229381 2/1990 Japan .
471085 3/1992 Japan .

OTHER PUBLICATIONS

"Floating-Point Processors" Komori et al., IEEE International Solid-State Circuits Conf., Digest of Technical Papers, pp. 46-47, Feb. 1989.

Primary Examiner—Alyssa H. Bowler
Assistant Examiner—John Harrity

[57] ABSTRACT

A data driven type information processor includes a program storing unit storing a data flow program in a number of memory banks wherein the number is greater than one. The data flow program includes a series of program lines divided into a plurality of clusters, and the memory banks store the data flow program such that each program line of a cluster is stored in a different memory bank. Each program line includes at least destination information and instruction information, and the destination information includes at least a cluster identifier. The program storing unit responsive to a cluster identifier of received destination information reads a cluster of program lines stored in the memory banks. The program storing unit outputs an instruction data packet corresponding to each read program line wherein the instruction data packet includes destination information and instruction information. A junction unit of the processor produces merged data packets by merging instruction data packets output by the program storing unit with operand data packets. A paired data detecting unit merges merged data packets having destination information which satisfy a predetermined relationship, and a branch unit outputs destination information to the program storing unit based on data packets received from the paired data detecting unit. An operation processing unit of the processor produces the operand data packets by processing operand information output by the branch unit in accordance with instruction information output by the branch unit.

20 Claims, 25 Drawing Sheets

|  | Cb | Ci | Op cm1 | cm2 | f | 550 |
|---|---|---|---|---|---|---|
| ① | n+1 | 1 | + | LEFT | 1 | |
|  | n+1 | 2 | dec | / | / | |
| ② | n+1 | 1 | + | RIGHT | 1 | |
|  | n+1 | 3 | * | LEFT | / | |
| ③ | n+1 | 3 | * | RIGHT | 1 | |
|  | n+1 | 5 | − | LEFT | / | |
| ④ | n+1 | 4 | inc | / | / | |
| ⑤ | n+1 | 5 | − | RIGHT | / | |

CLUSTER n

CLUSTER n+1

DATA DRIVEN TYPE INFORMATION PROCESSOR HAVING A PLURALITY OF MEMORY BANKS

BACKGROUND OF THE INVENTION

1. Field of the Invention

The present invention relates to a data driven type information processor and, more specifically, to a data driven type information processor which can execute data flow programs at high speed by improving capability of parallel execution of instructions.

2. Description of the Related Art

In a conventional yon-Neumann computer, various informations as a program are stored in a program memory in advance, and addresses in the program memory are sequentially specified by a program counter, so that the instructions are sequentially read out, whereby the instructions are executed.

On the other hand, a data driven type information processor is one type of non-von-Neumann computers, having no concept of sequential execution of instructions by a program counter. Such data driven type information processor employs architecture based on parallel processing of instructions. In the data driven type information processor wherein an execution of an instruction is enabled upon collection of data to be operated, a plurality of instructions are simultaneously driven by data, so that programs are executed in parallel in accordance with a natural flow of the data. As a result, it is considered that a time required for the operation is expected to be drastically reduced.

Referring to FIG. 5 showing a conventional data packet to be processed by the conventional data driven type image processor, a data packet Pa includes a destination field F1, an instruction field F2, a data 1 field F3 and a data 2 field F4. The destination field F1 stores a destination node number ND. The instruction field F2 stores an instruction code OP. The data 1 field F3 or the data 2 field F4 stores an operand data OPD. Referring to FIG. 1, the conventional data driven type image processor includes a program storing unit 50, a paired data detecting unit 56, an operation processing unit 60, an input unit 52, a junction unit 54 and a branch unit 58.

The junction unit 54 has two input ports I1 and I2 and two output ports O1 and O2, as shown in FIG. 2. Data packets output from output ports O1 and O2 are synchronized with each other.

Branch unit 58 includes two input ports i1 and i2 and two output ports o1 and o2.

Program storing unit 50 of FIG. 1 includes a memory access unit 102, a memory unit 100 and a packet generation unit 104, as shown in FIG. 3. The memory access unit 102 has its input end connected to output port o1 of branch unit 58. Packet generation unit 104 has its output end connected to input port I1 of junction unit 54. Memory unit 100 stores data flow program 170 shown in FIG. 4.

Memory access unit 102 reads a set of destination node number 112 (ND) and an instruction code 114 (OP) of the data flow program 110 stored in memory unit 100 as shown in FIG. 4, by address designation on the basis of the destination node number ND of a given data packet, and provides the destination node number 112 and the instruction code 114 to packet generation unit 104. Packet generation unit 104 stores the read destination node number 112 and the instruction code 114 in destination field F1 and instruction field F2 of the data packet Pa, respectively, and outputs the data packet. Program storing unit 50 is capable of outputting one instruction per one address designation.

Paired data detecting unit 56 matches input data packets Pa. More specifically, upon detection of two different data packets having the same destination node number ND, paired data detecting unit 56 stores operand data OPD of one of these data packets, for example the content of data 1 field F3 of FIG. 5, in data 2 field F4 of the other one of the data packets, and outputs said the other data packet Pa.

Operation processing unit 60 performs operation processing on one or two operand data OPD stored in the given data packet Pa in accordance with the instruction code OP stored therein, stores the result in data 1 field F3 of the data packet Pa and outputs this data packet.

FIGS. 6 (a) to (h) and 7 (a) to (e) show field structures of data packets flowing through the data driven type information processor shown in FIG. 1 during execution of a program.

Referring to FIG. 1, two input ports of input unit 52 are connected to data transmission paths 62 and 64. A data packet 134 including a destination field 130 and an instruction field 132 shown in FIG. 6 (a) is applied to data transmission path 62. A data packet 138 including such a data field as shown in FIG. 6 (b) is applied to data transmission path 64. Two output ports of input unit 52 are connected to input ports I1 and I2 of junction unit 54 through data transmission paths 68 and 70.

The output port of program storing unit 50 is connected to a data transmission path 82, which in turn is connected to input port I1 of junction unit 54. A data packet 144 including a destination field 140 and an instruction field 142 such as shown in FIG. 6 (c) is applied to data transmission path 82.

The output port of operation processing unit 60 is connected to a data transmission path 92, which in turn is connected to input port I2 of junction unit 54. A data packet 148 including a data field 146 such as shown in FIG. 6 (d) is applied to data transmission path 92.

Two output ports O1 and O2 of junction unit 54 are connected to two input ports of paired data detecting unit 56 through data transmission paths 72 and 74, respectively. A data packet 154 including a destination field 150 and an instruction field 152 such as shown in FIG. 6 (e) is applied to data transmission path 72. A data packet 158 including a data field 156 such as shown in FIG. 6 (f) is applied to data transmission path 74.

Two output ports of paired data detecting unit 56 are connected to two input ports i1 and i2 of branching unit 58 through data transmission paths 76 and 78. A data packet 164 including a destination field 160 and an instruction field 162 such as shown in FIG. 6 (g) is applied to data transmission path 76. A data packet including a data 1 field 166 and a data 2 field 168 such as shown in FIG. 6 (h) is applied to data transmission path 78. One output port o1 of branching unit 58 is connected to an input port of program storing unit 50 through a data transmission path 80 and to one input port of operation processing unit 60 through a data transmission path 86. Branching unit 58 is connected to the outside of the processor through a data transmission path 84. The other output port o2 of branching unit 58 is connected to the outside of the processor through a data transmission path 88 and to the other input port of operation processing unit 60 through a data transmission path 90. A data packet 182 including a destination field 180 such as shown in FIG. 7 (a) is applied to data transmission path 80, and a data packet 186 including an instruction field 184 such as shown in FIG. 7 (b) is applied to data transmission path 86. A data packet 192 including a data 1 field 188 and a data 2 field 190 such as shown in FIG. 7 (c) is applied to data transmission path 90. A data packet 198 including a destination field 194 and an instruction field 196 such as shown in FIG. 7 (d) is applied to data transmission path 84, and a data packet 202 including a data field 200 such as shown in FIG. 7 (e) is applied to data transmission path 88.

Referring to FIG. 8, the conventional data driven type information processor operates in the following manner. First, a set of data packets 134 and 138 are externally input to input unit 52. These data packets 134 and 138 are transmitted to input ports I1 and I2 of junction unit 54, respectively. Initially, the data packets 134 and 138 are transmitted as they are to paired data detecting unit 56 through output ports O1 and O2, as data packets 154 and 158, respectively. When two sets of different data packets having the same destination node number are detected at paired data detecting unit 56, a set of data packets 164 and 170 are output from paired data detecting unit 56. Branch unit 58 selects either continuation of internal processing related to these data packets 164 and 170 or external transmission of these data packets 164 and 170. If internal processing is to be continued, branch unit 58 separates data packet 164 into a data packet 182 including the destination field and a data packet 186 including an instruction field, transmits data packet 182 to program storing unit 50, and transmits data packet 186 to operation processing unit 60. Branch unit 58 transmits data packet 170 to operation processing unit 60 as data packet 192. If data packets 164 and 170 are to be output externally, data packet 164 is not separated. Data packet 164 to be externally output is output as a data packet 198, and similarly, data packet 170 is output as data packet 202.

Operation processing unit 60 performs operation processing related to one or two operand data OPD stored in data packet 192 in accordance with instruction code OP stored in data packet 186, and outputs a data packet 148 which stores only the data representing the result of operation.

In program storing unit 50, by address designation on the basis of destination node number ND stored in data packet 182, next destination node number and next instruction code in the data flow program 110 shown in FIG. 4 are read. A data packet 144 including the destination node number and the instruction code read from program storing unit 50 is output to data transmission path 82.

Thereafter, processing in accordance with data flow program 110 proceeds as each of the data packets circulates through the processing units in a certain order, in the same manner as described above.

Junction unit 54 arbitrates between externally applied data packets and internally processed data packets. When an internally processed data packet 144 contends with an externally applied data packet 134, the internally processed data packet 144 is given priority to be output from output port O1. The data packet, to which priority is not given, is kept waiting in an internal buffer, not shown, at junction unit 54 until there remains no contender. At output port O2, if internally processed data packet 144 is selected at output port O1, than data packet 148 output from operation processing unit 60 is selected. If the externally applied data packet 134 is selected at output port O1, an externally applied data packet 138 is selected. Data packet 158 is output in synchronization with data packet 154. The data packet not selected is kept waiting in the internal buffer.

The data packet 170 output from paired data detecting unit 56 is generated in the following manner. When instruction code OP of the corresponding data packet 164 indicates a one operand instruction in which only one operand data is required, operand data OPD is stored only in data 1 field 166. When the corresponding instruction code OP indicates a two operand instruction requiring two operand data, operand data OPD is stored in each of data 1 field 166 and data 2 field 168.

Therefore, it becomes possible to combine (merge) a new data packet read from program storing unit 50 with a corresponding data packet processed by operation processing unit 60 without adding any special identification information to the data packet separated by branch unit 58.

Again referring to FIG. 4, each line of data flow program 110 includes a destination node number 112, an instruction code 114 as well as a copy present/absent information 116 and a constant present/absent information 118. If the constant present/absent information indicates "present", it means that constant data 119 is stored in the next line. The copy present/absent information 116 and the constant present/absent information 118 are used in the following manner.

FIG. 9 shows an example of a data flow graph. Referring to FIG. 9, a node N1 indicates an addition instruction, node N2 a multiplication instruction, and node N3 a subtraction instruction. A node N4 indicates a decrement instruction while a node N5 indicates an increment instruction. Instructions at nodes N1, N2 and N3 are two operand instructions while instructions at nodes N4 and N5 are one operand instructions. The result of operation at node N1 is referred to by nodes N2 and N3. In this case, an output from node N1 must be applied to two nodes N2 and N3, and therefore a copy is provided at program storing unit 50.

Copying is done in the following manner. At first, according to the destination node number of the input data packet, content of the line at the designated address is read from data flow program 110. If copy present/absent information 116 indicates "absent" at this time, a data packet in which the contents of the destination field and the instruction field are updated is provided as an output and the process ends.

If copy present/absent information 116 indicates "present", the data packet in which the contents of the destination field and of the instruction field updated is output, and in addition, the destination node number 112, instruction code 114, copy present/absent information 116 and constant present/absent information 118 stored in the next line of data flow program 110 are read. If the newly read copy present/absent information 116 indicates "absent", the same data as the input data packet is stored in the data 1 field of the new data packet, the newly read destination node number and the instruction code are respectively stored in the destination field and the instruction field of the new data packet, and the new data packet is output. If the newly read copy present/absent information 116 indicates "present", the similar copying operation is further continued.

In the above described information processor, when packet data is processed in accordance with the data flow graph shown in FIG. 9, it requires only three steps.

The operation processing unit 60 makes use of pipelining so as to enable such processing.

The operation processing unit employing pipelining is disclosed in an article entitled "Floating Point Processors", 1989. IEEE International Solid State Circuits Conference, DIGEST OF TECHNICAL PAPERS, pp. 46 and 47.

FIG. 10 is a block diagram showing an outline of the operation processing unit disclosed in the aforementioned article.

Referring to FIG. 10, the operation processing unit includes an input unit 210, an output unit 213, a multiplication unit 211, an accumulator 212, a pre-processing unit 214, an arithmetic logic unit 215 and a post-processing unit 216.

Input unit 210 has its input connected to an output of paired data detecting unit 56 through branch unit 58 (FIG. 1) and its output connected to multiplication unit 211 and to pre-processing unit 214. Output unit 213 has its output connected to an input of junction unit 54 (FIG. 1). Multiplication unit 211 has its output connected to an input of output unit 213 through accumulator 212. Pre-processing unit 214 has its output connected to arithmetic logic unit 215. Arithmetic logic unit 215 has its output connected to an input of output unit 213 through post-processing unit 216.

Namely, the operation processing unit includes two parallel transmission paths, that is, a data path passing through input unit 210, multiplication unit 211, accumulator 212 to output unit 213, and a data path passing through input unit 210, pre-processing unit 214, arithmetic logic unit 215, post-processing unit 216 to output unit 213.

In operation, input unit 210 and output unit 213 convert 2 words (operand data of data 1 field and data 2 field) included in the input packet data into 1 word for internal processing. In integer operation, multiplication unit 211 multiplies two data which have been converted to 1 word. Accumulator 212 is used to carry out "multiply and accumulate" operation included in the integer operation instruction. Pre-processing unit 214 recognizes floating point arithmetic instruction, realigns data for floating point arithmetic operation and applies the same to arithmetic logic unit 215. However, if it is not a floating point arithmetic instruction, pre-processing unit 214 applies the input data as it is to the arithmetic logic unit 215. Arithmetic logic unit 215 has a plurality of functions such as floating point arithmetic operation, logical operation, integer operation and executes various operations in accordance with instruction information included in the instruction field of the data packet. Post-processing unit 216 converts results of floating point arithmetic operation to normalized data. As for the results of other operations, post-processing unit 216 provides the applied data as it is to output unit 213.

The above described operation processing unit is capable of processing at most two operand data based on instruction information included in the packet data output from paired data detecting unit 56.

FIG. 10 shows general value of process time in each unit, normalized by using the process time in arithmetic logic unit 215 as a reference unit. The process time in multiplication unit 211 is "2", process time in accumulator 212 is "1", process time in pre-processing unit 214 is "0.5" and process time in post-processing unit 215 is "0.5".

Recently, improvement in processing rate of the data driven type information processor has been particularly desired. To meet such demand, the processing rate must be improved in each of program storing unit 50, paired data detecting unit 56 and operation processing unit 60.

Conventionally, program storing unit 50 reads one data per one access and provides the read data to paired detecting unit 56. Paired data detecting unit 56 performs one paired data detection for one input data, and provides the data storing the result of detection to program storing unit 50 as well as to operation processing unit 60. Since operation processing unit 60 carries out operation processing for one input data, once such operation is completed, the operation processing unit 60 is kept waiting for the next one data input to effect the next processing. Accordingly, the rate of operation processing by the operation processing unit 60 can be improved by reducing the wait time till the next processing.

In order to reduce the wait time, the number of paired data detection per unit time in paired data detection unit 56 should be increased so that the amount of data supplied from paired data detecting unit 56 to operation processing unit 60 per unit time is increased. In order to increase the amount of data to be supplied, the amount of read data per unit time in program storing unit 50 should be increased. However, the program storing unit 50 in the conventional processor reads only one data at one access. In order to read a large amount of data per unit time, increase in access speed of the program storing unit is the only way. However, when a memory allowing high speed accessing is employed in the program storing unit 50, the cost of the processor itself as well as the cost of the system including the processor is increased, which makes this approach impractical.

Further, if a high speed access memory is employed in the program storing unit 50, the improvement of processing rate of the information processor is defined by the speed of accessing of the program storing unit 50.

The operation processing unit of the conventional processor has the following problem related to the processing rate. In the operation processing unit disclosed in the aforementioned article shown in FIG. 10, all input data except integer multiplication pass through the pre-processing unit 214. Results of all operations except the result of multiplication pass post-processing unit 216. Therefore, the process time of "0.5" is necessary for data to pass through the pre-processing portion 214, and in addition, process time of "0.5" is necessary for data to pass through post-processing unit 216. However, not all data processed by the arithmetic logic unit 215 except the floating point data require realignment in the pre-processing unit 214 and conversion to the normalized data in the post-processing unit 216, and the data simply pass through the processing units 214 and 216. Thus the total processing time of "1" for passage therethrough is wasted.

Further, although all results of operations in the multiplication unit 211 are applied to accumulator 212, it is not necessary to accumulate all the results of multiplication. Therefore, the process time "1" for the passage through accumulator 212 may be wasteful.

In summary, the operation processing unit of the conventional processor allows for improvements of processing rate.

SUMMARY OF THE INVENTION

Therefore, an object of the present invention is to provide a data driven type image processor operable at higher speed, without much increasing the cost of the processor.

Another object of the present invention is to improve speed of operation of a data driven type information processor, without using a program memory allowing high speed accessing.

An additional object of the present invention is to improve speed of operation of the data driven type information processor by eliminating wasteful processings in the operation unit for various operations.

The data driven type information processor of the present invention processes information in accordance with a data flow program including a series of instruction lines each including an instruction and destination information. The data driven type information processor includes a program memory storing a series of instruction lines, responsive to an input of a data packet storing at least a part of destination information, reading one or a plurality of instruction lines specified by the destination information of the input data packet for generating and outputting one or a plurality of instruction data packets. Each instruction data packet includes an instruction included in individual instruction line and destination information. The processor further includes a merge unit having a plurality of inputs including a first input connected to an output of the program memory, merging the instruction data packet and a data packet storing an operand for execution of the instruction as well as destination information applied through one of the inputs other than the first input, for outputting one merged data packet, and a paired data group detecting unit for detecting, among the applied merged data packets, a group of pairs of which destination information satisfies a predetermined relation for outputting a plurality of data packets. Each data packet output from the paired data group detecting unit includes an instruction, an operand and destination information included in separate one of the detected paired data groups. The processor further includes a switching unit having an input connected to an output of the paired data group detecting unit and a plurality of outputs for switching a data packet including a part of the destination information, an operand and an instruction included in the data packet, to one of the outputs of the switch unit based on the destination information included in the data packet applied from the paired data group detecting unit, and for applying a data packet storing destination information to the program memory, and a parallel operation unit having an input connected to an output of the switch unit and an output connected to an input of the merge means other than the first input for carrying out, in parallel, operations specified by instructions included in the plurality of data packets input through the switch unit with respect to the operands included in these data packets and for applying a plurality of data packet including results of respective operations and destination information included in respective data packets to the merge unit.

Since a plurality of data packets can be processed in parallel by the parallel operation unit, the parallel processing capability of the data driven type information processor can be improved without using a program memory which allows high speed accessing. Therefore, processing can be carried out faster without increasing the cost of the processor.

According to a preferred embodiment, the program memory is divided into a plurality of memory banks and allows output of a plurality of instruction data packets per one access. Since limitation of the speed of operation of the information processor by the access speed of the program memory can be released, the information processor of the present invention can operate faster than the prior art when a program memory of the same access speed is used.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Three embodiments of the present invention will be described in detail with reference to the figures.

The first embodiment will be described. The data driven type image processor in accordance with the first embodiment increases the amount of operation instructions executed per unit time in the processor, by reading a large amount of program data by one access to the program storing unit.

Figure 11:
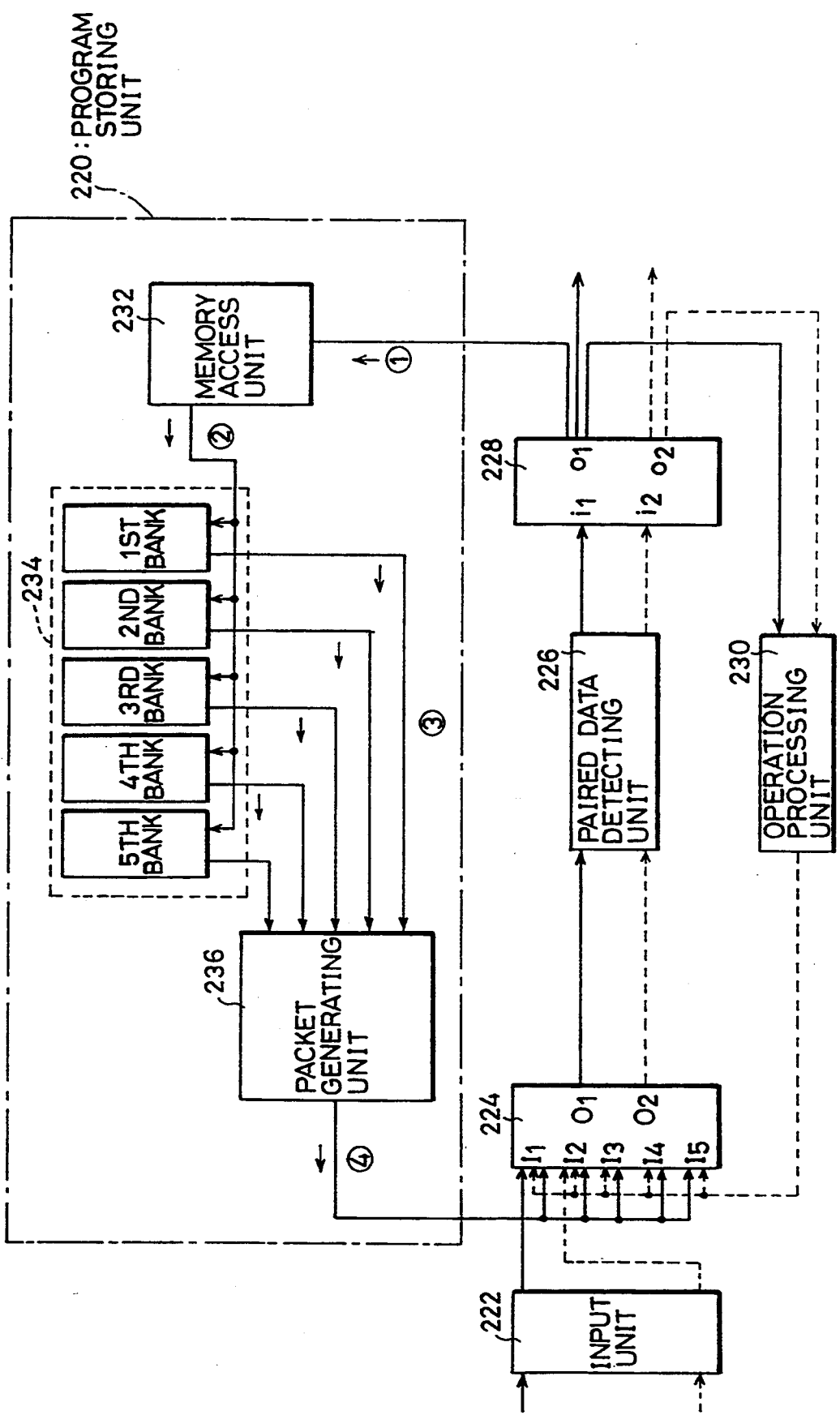
FIG. 11 is a block diagram of a data driven type information processor in accordance with a first embodiment of the present invention.

Referring to FIG. 11, the data driven type image processor in accordance with the first embodiment of the present invention includes a program storing unit 220, a paired data detecting unit 226, an operation processing unit 230, a junction unit 224, a branch unit 228 and an input unit 222.

The junction unit 224 has five input ports I1 to I5 and two output ports O1 and O2, as shown in the figure. Data packets output from output ports O1 and O2 are synchronized with each other.

Branch unit 228 includes two input ports i1 and i2, and two output ports o1 and o2. Details of the program storing unit 220 will be described later. Operation processing unit 230 and input unit 222 operate in the similar manner as operation processing unit 60 and input unit 52 described with reference to FIG. 1, respectively.

Referring to FIG. 11, program storing portion 220 includes a memory access unit 232 having its input end connected to output port o1 of branch unit 228, a memory bank unit 234 and a packet generating unit 236 having its output end connected to each of input ports I1 to I5 of junction unit 224.

Memory bank unit 234 is an area in which data flow program to be executed in the data driven type image processor is stored in advance, and it is divided, for example, into first to fifth bank program storing areas. Methods for storing the data flow program in the first to fifth banks in the memory bank unit 234 will be described later.

Figure 12:
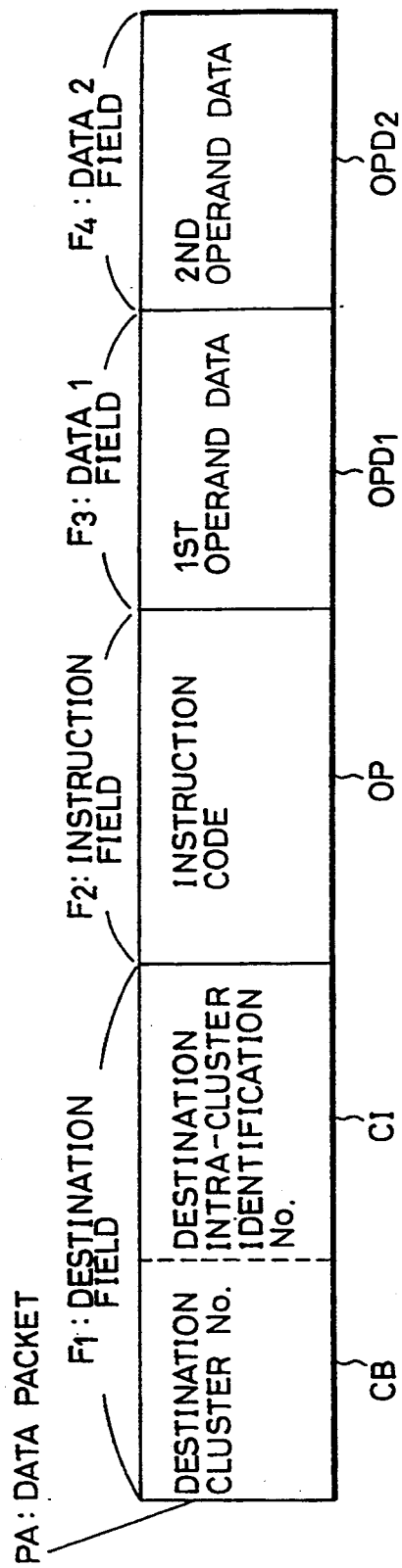
FIG. 12 shows basic field structure of a data packet processed in the data driven type information processor in accordance with first and second embodiments of the present invention.

Referring to FIG. 12, a data packet Pa includes a destination field F1, an instruction field F2, a data 1 field F3 and a data 2 field F4. Instruction field F2, data 1 field F3 and data 2 field F4 respectively store instruction code OP, a first operand data OPD1 and a second operand data OPD2. The next destination cluster number CB and the next destination intra-cluster identification number CI, which correspond to the conventional destination node number, are stored in destination field F1. Destination field F1 has a fixed bit width. Each of the areas for storing the destination cluster number CB and the destination intra-cluster identification number CI has variable bit width. The bit width of destination cluster number CB and of destination intra-cluster identification number CI is variably set by the memory capacity which can be accessed per one access of the memory bank unit 234, in other words, by the number of banks in the memory bank unit 234.

Figure 13:
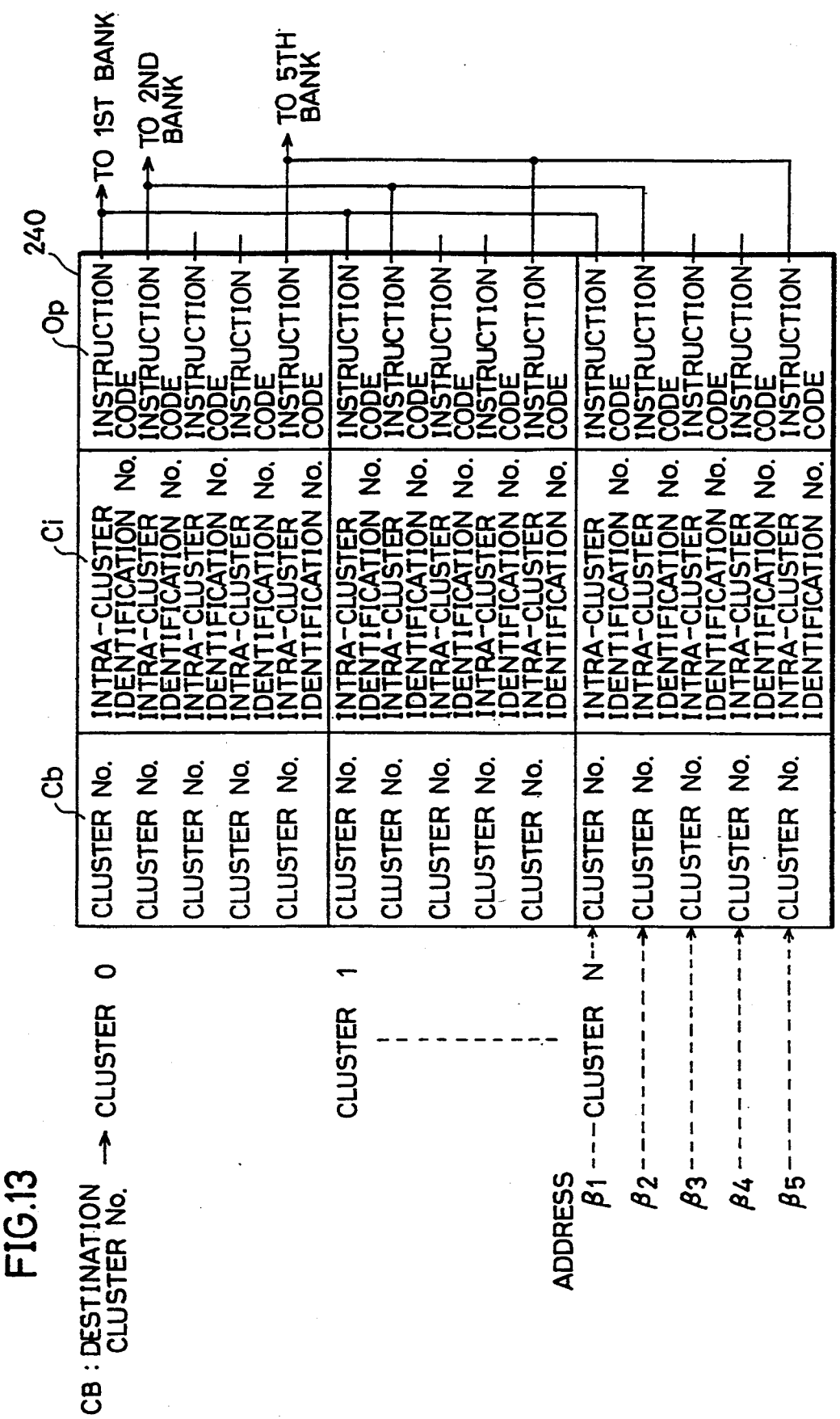
FIG. 13 shows a data flow program executed in the data driven type information processor in accordance with the first and second embodiments of the present invention and storage method thereof.

The data flow program 240 of FIG. 13 is stored in memory bank unit 234. Each line of data flow program 240 includes a cluster number Cb, an intra-cluster identification number Ci and an operation code Op. The term "cluster" refers to a set of program data. Program 240 includes $(n+1)$ clusters including cluster 0 to cluster N. When program 240 is stored in memory bank unit 234, memory access unit 232 can read all program data stored in the cluster corresponding to the designated cluster number in program 240 from memory bank unit 234, by an address designation based on the destination cluster number CB stored in a given data packet.

Program 240 is stored in memory bank portion 234 in the following manner.

Program 240 includes cluster 0 to cluster N. Each cluster includes five program data identified by intra-cluster identification number Ci, so that the memory bank unit 234 is divided into five banks. The first program data in each cluster of program 240 shown in FIG. 13 is stored in the first bank, the second program data of each cluster is stored in the second bank, the third program data of each cluster is stored in the third bank, the fourth program data of each cluster is stored in the fourth bank and the fifth program data in each cluster is stored in the fifth bank. As described above, the number of banks of memory bank unit 234 is defined by the number of program data included in each cluster, that is, the maximum number of intra-cluster identification number. The capacity (depth) of each bank is defined by the number of clusters stored in the program 240.

The operation of reading data flow program 240 from program storing unit 220 will be described with reference to FIG. 11.

A data packet is applied through a path (1) of FIG. 11 to memory access unit 232. Memory access unit 232 regards the destination cluster number CB stored in the input packet as a designation address for reading program data and accesses each bank of memory bank unit 234 through a path (2) simultaneously and individually. Memory bank unit 234 outputs data flow program data stored in the five addresses accessed. Therefore, five program data stored in designated cluster i (i=0, 1, 2, . . . , N) of the program 240 of FIG. 13 are all read by one access from memory bank unit 234.

The read five program data are successively transmitted to packet generating unit 236 through the path (3) in the order of reading. Packet generating unit 236 changes each applied program data into the form of data packets and transmits the same to respective ones of input ports I1 to I5 of junction unit 360 through the path (4) in a first-in, first-out order.

Five program data of cluster i read simultaneously from program storing unit 220 are synchronized with data transmitted from operation processing unit 230 at junction unit 224 and transmitted to paired data detecting unit 226. The input port of junction unit 224 is selected in the following manner. Assume that five program data stored in cluster N of program 240 shown in FIG. 13 are read and transmitted as data packets from packet generating unit 236. Assume also that five program data of cluster N are specified uniquely by addresses β1, β2, β3, β4 and β5 and read in this order. Program data corresponding to respective addresses are applied sequentially to ports I1, I2, I3, I4 and I5 of junction unit 224, allowing synchronization with the data from operation processing unit 230. When a data is transmitted from operation processing unit 230, any one of the import ports I1 to I5 is selected according to the next destination intra-cluster identification number CI stored in the data which corresponds to any of the addresses (β1, β2, β3, β4 and β5), and the data is taken in the junction unit 224 through the selected input port. Among the input ports of junction unit 224, at that input port at which data read from the program storing unit 220 and data processed by operation processing unit 230 are collected, two data are sequentially transmitted through output ports O1 and O2. Thereafter, the process proceeds in the similar manner as in the prior art in the order of paired data detecting unit 226, branch unit 228, operation processing unit 230 . . . . As for the execution of five program data corresponding to the cluster N of data flow program 240, only one access to program storing unit 220 is required. Therefore, as compared with the prior art, the number of accesses to program storing unit necessary for executing five program data can be reduced to 1/5. Accordingly, the paired data detecting unit 226 and operation processing unit 230 have their operations less frequently kept waiting for the next program data read from the program storing unit 220.

Figure 6:
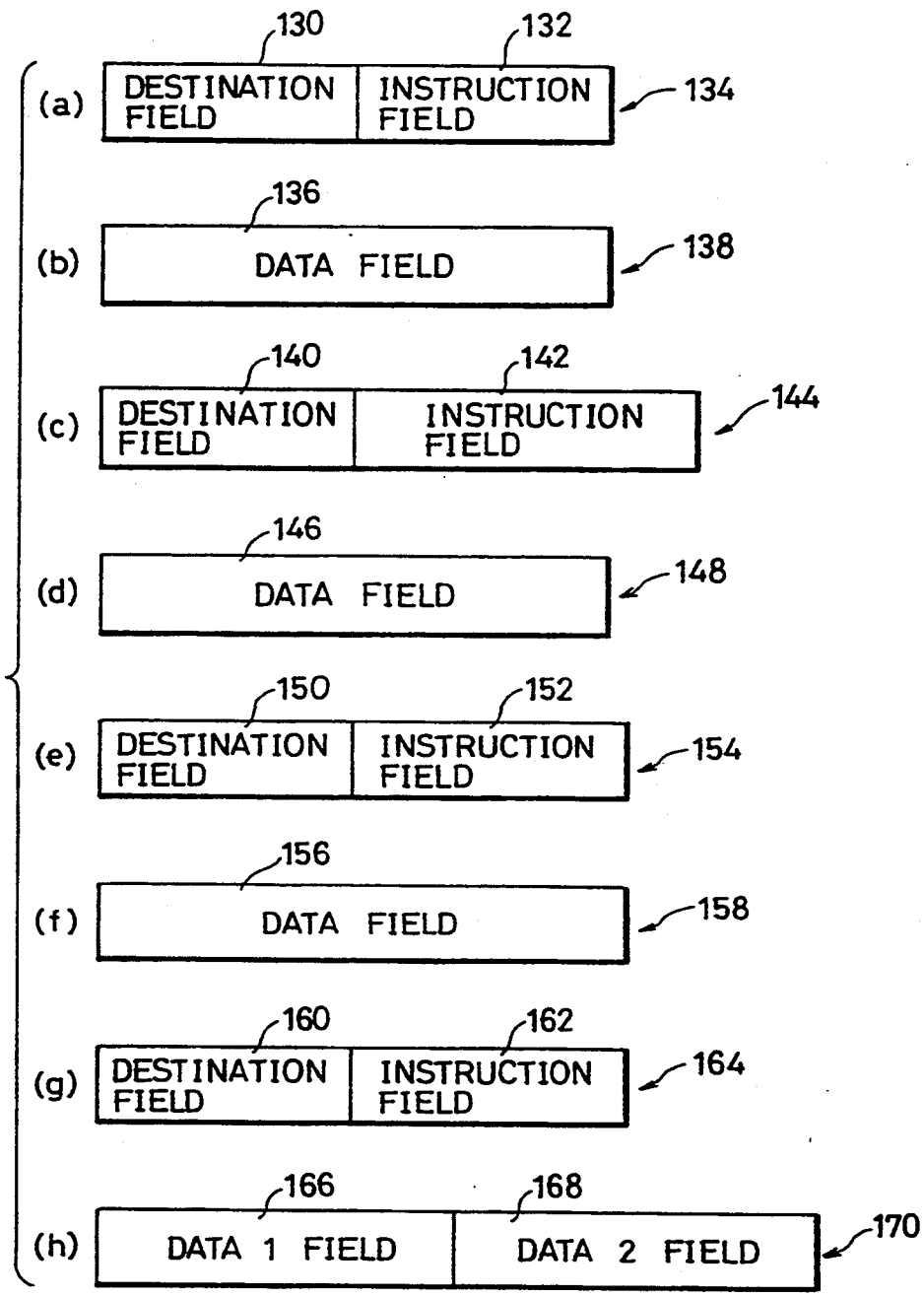
FIGS. 6 (a) to (h) and 7 (a) to (e) show field structures of data packets flowing in the data driven type information processor shown in FIG. 1 during execution of the program.
Figure 8:
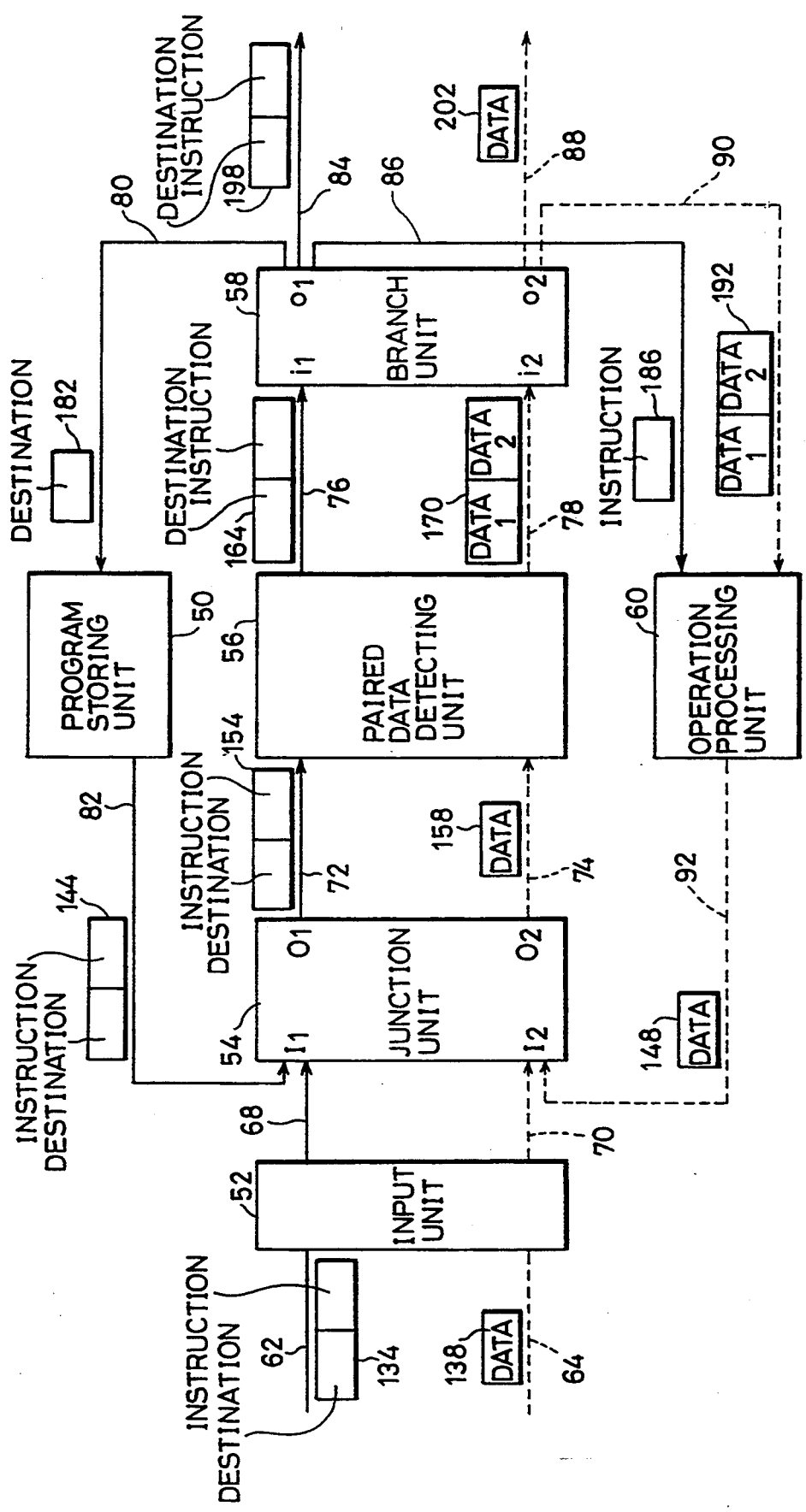
FIG. 8 shows operation during execution of a program in the data driven type information processor shown in FIG. 1 along the flow of various data packets.
Figure 9:
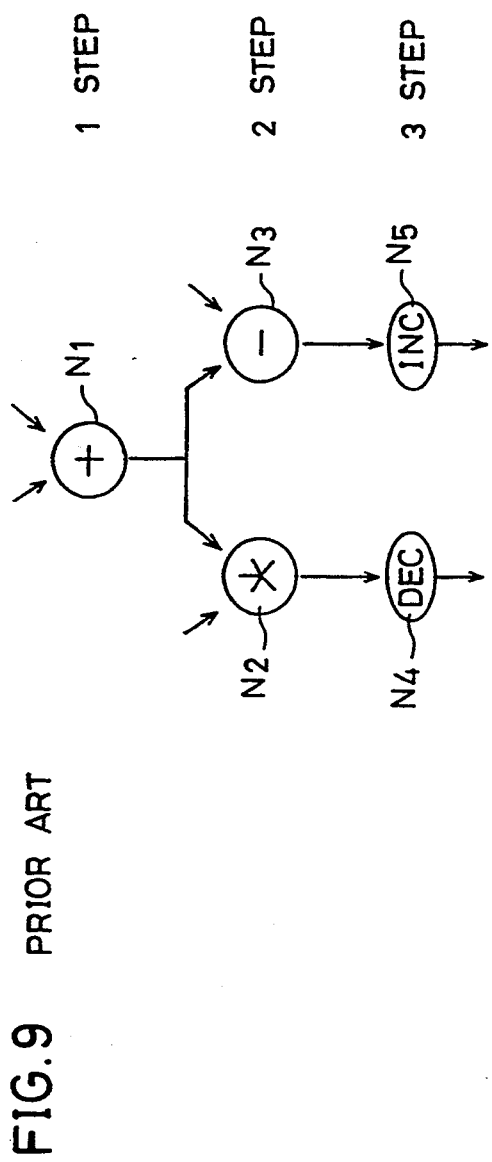
FIG. 9 shows a portion of a data flow graph including copying operation.
Figure 15:
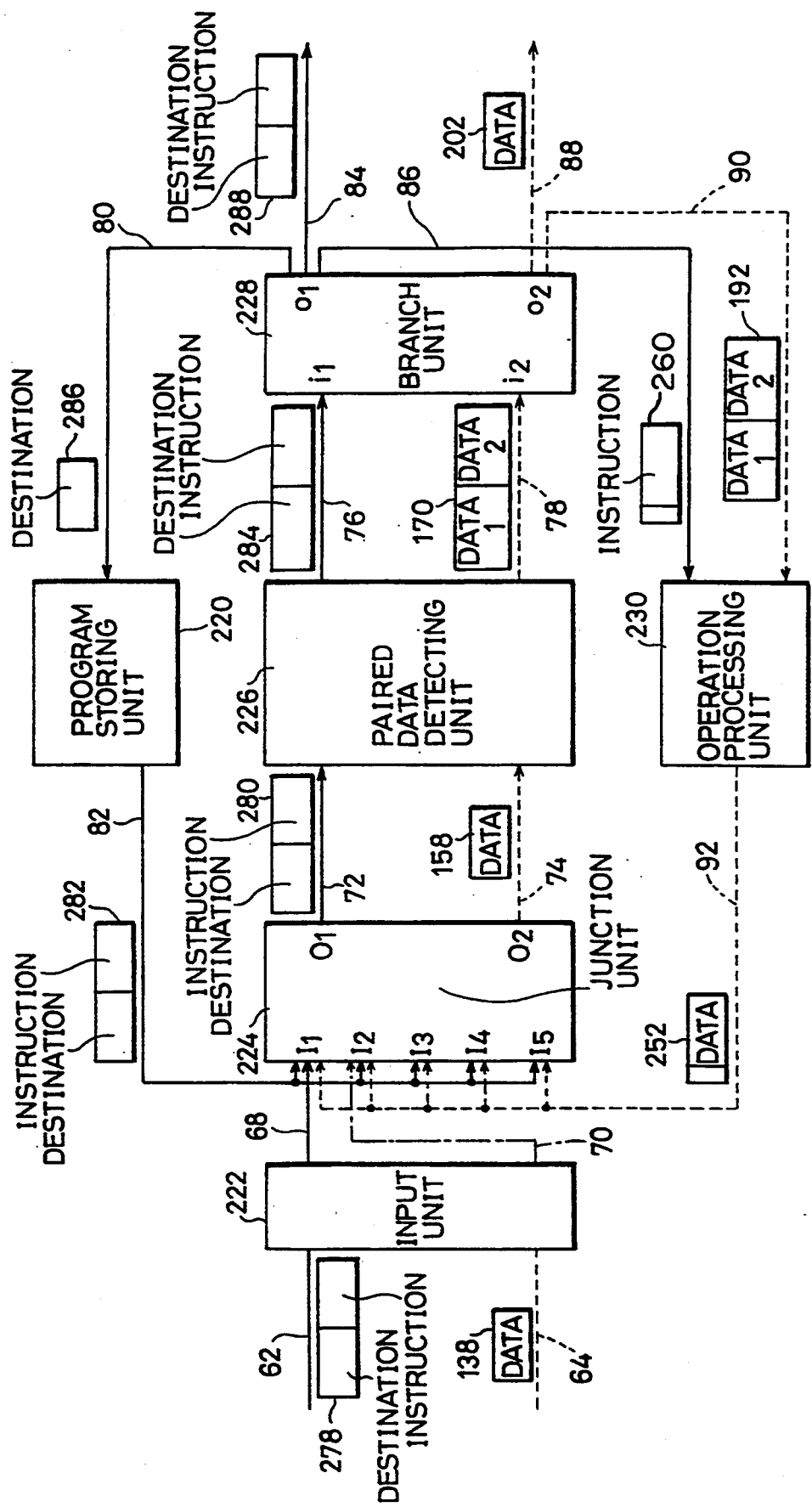
FIG. 15 shows operation of the data driven type image processor shown in FIG. 11 during execution of a program along a flow of various data packets.

Referring to FIGS. 15, 8 and 6, the packet 278 of FIG. 15, for example, has the similar field structure as the conventional data packet 134 shown in FIGS. 8 and 6 (a). The content of destination field of the packet 278 is different from that of the conventional destination field 130 (see FIG. 6 (a)). Similarly, data packets 280, 282, 284, 286, 288, 188 and 254 correspond to data packets 154, 144, 164, 182, 198, 186 and 148 of FIG. 6 showing the data packets, respectively. Data packets denoted by the same reference numerals as in FIG. 6 are the same as those shown in FIG. 6.

Figure 14:
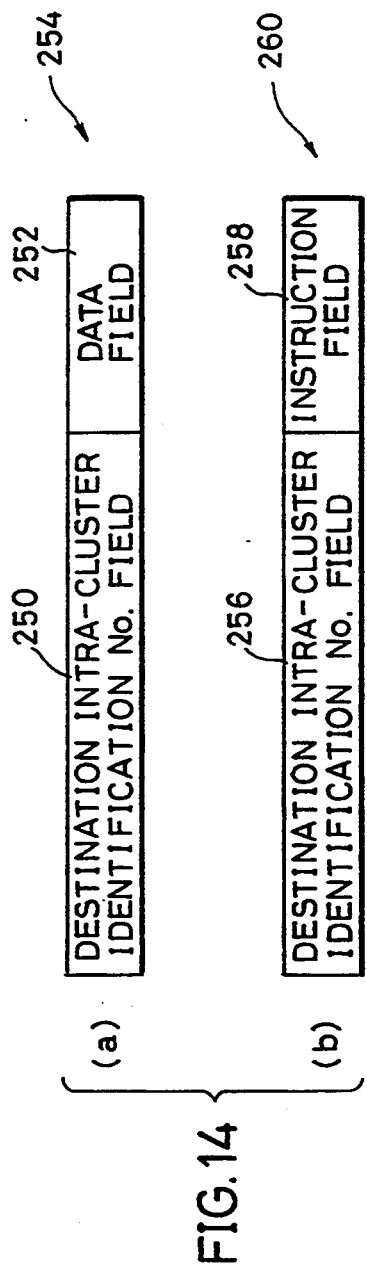
FIGS. 14 (a) and (b) show field structure of a portion of the data packet group flowing in the data driven type image processor shown in FIG. 11 during execution of a program.

Referring to FIG. 15, two output ports of input unit 222 are connected to input ports I1 and I2 of junction unit 224 through data transmission paths 68 and 70. Program storing unit 220 has its output port connected to input ports I1 to I5 of junction unit 224 through data transmission paths 82. Operation processing unit 230 has its output port connected to input ports I1 to I5 of junction unit 224 through data transmission path 92. A data packet 254 including a destination intra-cluster identification number field 250 and a data field 252 is applied to data transmission path 92 as shown in FIG. 14 (a). Branch unit 228 has its output port o1 connected to one input port of operation processing unit 230 through data transmission path 86. A data packet 260 including a destination intra-cluster identification number field 256 and an instruction field 258 such as shown in FIG. 14 (b) is applied to data transmission path 86.

The data transmission paths connecting various portions in FIG. 15 are the same as those shown in FIG. 8 and detail description thereof is not repeated.

Referring to FIG. 15, the data driven type information processor in accordance with the first embodiment operates in the following manner.

First, a set of data packets 278 and 138 are externally input to input unit 212. Data packets 278 and 138 are applied to input ports I1 and I2 of junction unit 224, respectively. At first, data packets 278 and 138 are directly transmitted to paired data detecting unit 226 as data packets 280 and 158, from output ports O1 and O2, respectively. When two sets of different data packets having the same destination information (destination cluster number CB and intra-cluster identification number CI) are detected at paired data detecting unit 226, a set of data packets 284 and 170 are output from paired data detecting unit 226. Branch unit 228 selects either continuation of internal processing related to data packets 284 and 170, or transmission of these data packets 284 and 170 externally. When internal processing is to be continued, branch unit 228 separates data packet 284 into a data packet 286 including a destination field, and a data packet 188 including a destination intra-cluster identification number field. The Branch unit 228 and an instruction field transmits packet 286 to program storing unit 220 and transmit data packet 260 to program processing unit 230. Branch unit 228 transmits data packet 170 to operation processing unit 230 as data packet 192. When data packets 284 and 170 are to be externally output, data packet 284 is not separated. Data packet 284 to be externally output is output as data packet 288, and similarly, data packet 170 is output as data packet 202.

Operation processing unit 230 carries output operation processing of one or two operand data OPD1 and OPD2 stored in data packet 192 based on instruction code OP stored in data packet 260, and outputs a data packet 254 including a data field storing the result of operation and a destination intra-cluster identification number field. In program storing unit 220, a data packet 282 is generated for each of the simultaneously read five program data by address designation based on the destination cluster number CB stored in data packet 286 and transmit the to junction unit 224. Junction unit 224 sequentially inputs applied data packet 282 to input ports I1, I2, I3, I4 and I5 in a first-in, first-out manner.

Data packet 254 storing the result of operation transmitted from operation processing unit 230 is applied to junction unit 224. Junction unit 224 selects any one of input ports I1 to I5 based on the destination intra-cluster identification number CI stored in data packet 254 and takes in data packet 254 through the selected input port. When data packets 282 and 254 are input to any of the input ports I1 to I5, junction unit 224 transmits data packet 282 as packet 280 through output port O1, and transmits data packet 254 as packet 158 through output port O2. At this time point, destination information related to the operand data stored in data packet 254 is updated by using the destination information stored in destination field in data packet 282. Junction unit 224 carries out arbitration between internally processed data packet and data packet externally applied through input unit 222 in the same manner as in the prior art.

Paired data detecting unit 226 receives data packets 280 and 158 output from junction unit 224, and waits for two different data packets having matching destination information, by using destination cluster number CB and destination intra-cluster identification number CI (=destination node number) stored in the destination field of packet 280.

Program storing unit 220 simultaneously reads on cluster basis of data flow program 240 of FIG. 13, a plurality of program data corresponding to destination cluster number CB stored in data packet 286 which has been subjected to paired data detection and branching by the branch unit 228. In this manner, operation processing in accordance with the data flow program 240 stored in program storing unit 220 proceeds.

In reading of program data at program storing unit 220 mentioned above, successive leading to the same cluster is inhibited. More specifically, program storing unit 220 compares destination cluster number CB stored in data packet 286 applied to memory access unit 232 shown in FIG. 11 with destination cluster number CB stored in latest applied data packet 286 (stored in internal buffer). When both match with each other, access based on the input data packet 286 at this time is inhibited. Such inhibition of reading is effected to avoid successive reading of program data corresponding to the cluster number the reading of which is not completed (that is, which is being read), since access to the memory bank unit 234 is effected on cluster basis of data flow program 240.

As described above, according to the first embodiment, all program data (five operand instructions) in 1 cluster of program 240 are read and executed per one access to program storing unit 220. Compared with the prior art in which one program data is read per one access, the efficiency of accessing can be improved by the number of programs in the cluster. In this embodiment, improvement of access rate approximately five times that of the prior art is effected by simple calculation.

A second embodiment will be described. The data driven type information processor in accordance with the second embodiment includes a program storing unit for reading a plurality of data per one access, a paired data detecting unit for simultaneously and individually executing waiting/match detection of a plurality of data, and an operation processing unit for simultaneously and individually executing a plurality of instructions. By such structure, the processor of the second embodiment can operate at larger processing rates than the data driven type information processor shown in FIG. 1, needless to say the conventional data driven type information processor.

Figure 16:
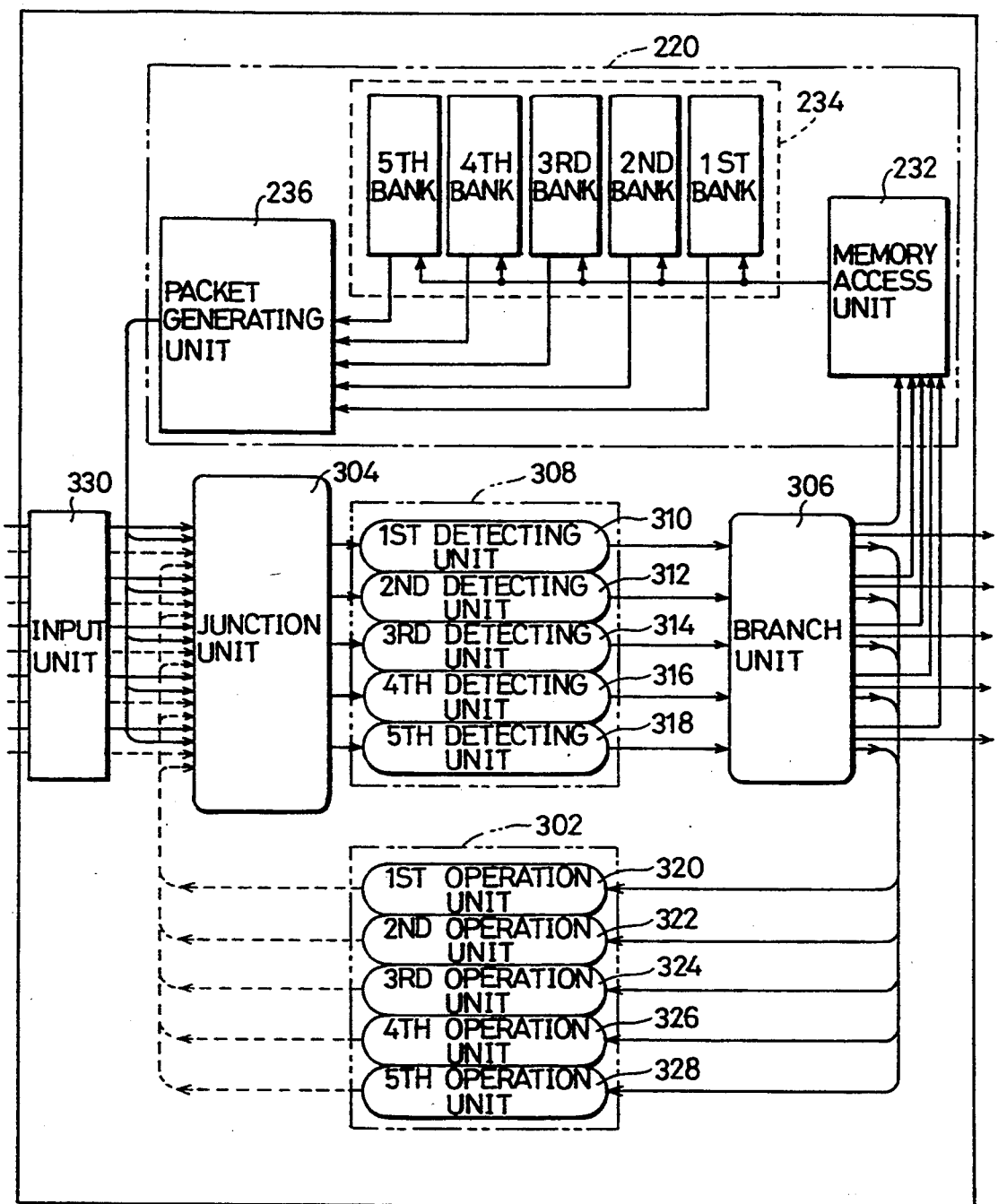
FIG. 16 shows a block structure of a data driven type image processor in accordance with a second embodiment of the present invention.

Referring to FIG. 16, the data driven type information processor 300 in accordance with the second embodiment of the present invention includes, in addition to program storing unit 220 of the first embodiment, a paired data detecting unit 308 for simultaneously and individually effecting waiting/match detection of five data, operation processing unit 308 for simultaneously and individually executing five instructions, a junction unit 304, a branch unit 306 and an input unit 330.

Paired data detecting unit 308 includes a first detecting unit 310, a second detecting unit 312, a third detecting unit 314, a fourth detecting unit 316 and a fifth detecting unit 318, as shown in the figure.

Operation processing unit 302 includes a first operation unit 320, a second operation unit 322, a third operation unit 324, a fourth operation unit 326 and a fifth operation unit 328. Such structure of paired data detecting unit 308 and operation processing unit 302 allows parallel paired data detection of each of the program data read per one access from program storing unit 220 and further allows parallel processing of each of the program data read per one access from program storing unit 220. The number of detecting units and the number of operations units provided in paired data detecting unit 308 and in operation processing unit 302 can be varied corresponding to the number of program data (bank number) read per one access from program storing unit 220, respectively.

Figure 17:
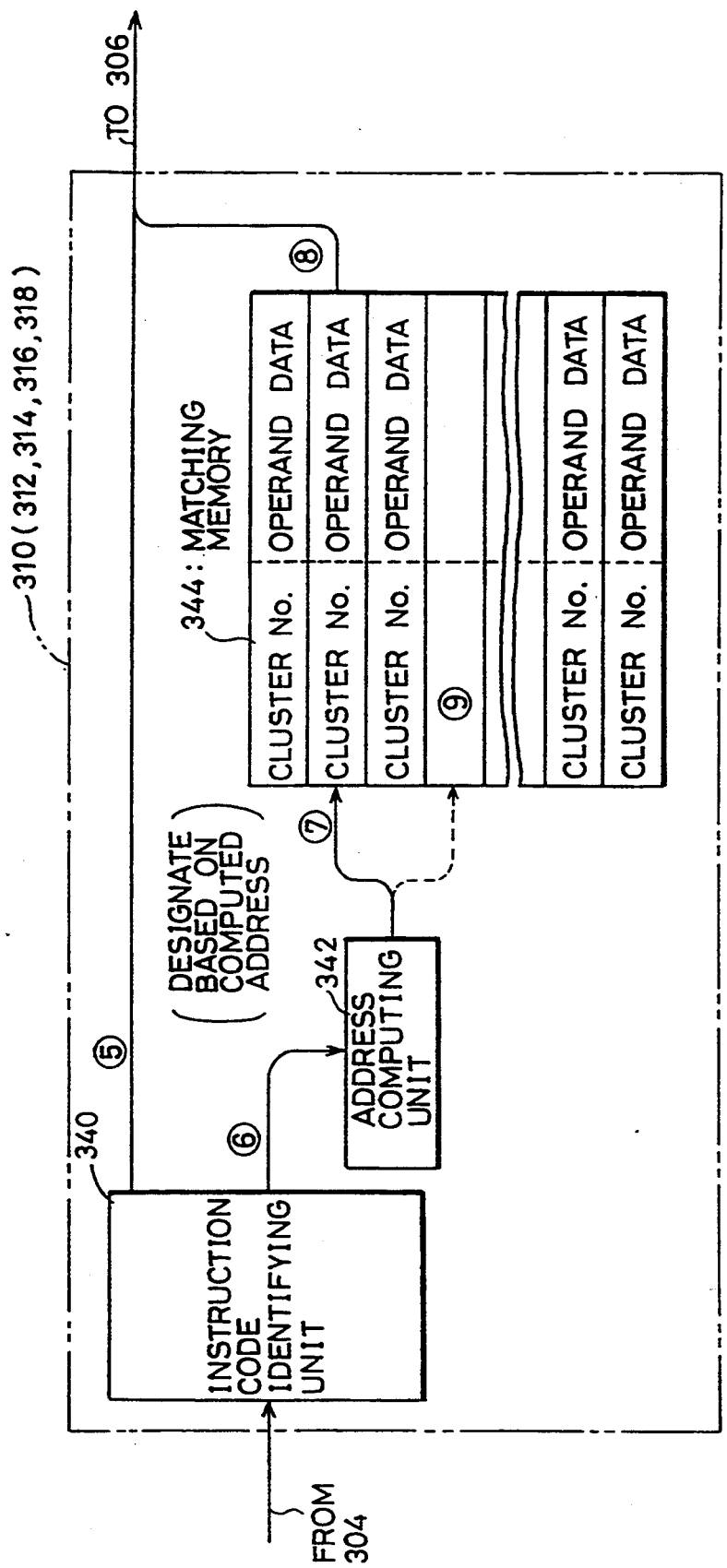
FIG. 17 is a block diagram of the nth detecting unit of FIG. 16.

FIG. 17 shows a block structure of the nth detecting unit of FIG. 16. Each of detecting units 310 to 318 of paired data detecting unit 308 has the same block structure. Referring to FIG. 17, the nth detecting unit includes an instruction code identifying unit 340, an address counting unit 342 and a matching memory 344.

The nth detecting unit receives a data packet applied from junction unit 304 of the preceding stage, and based on whether the instruction code OP stored therein is a one operand instruction or a two operand instruction, determines whether or not processing for waiting/match detection should be effected on the input data packet at matching memory 344.

Instruction code identifying unit 340 receives the data packet transmitted from junction unit 304 and determines whether or not the instruction code OP stored therein is a one operand instruction requiring one operand data. If it is a one operand instruction, instruction code identifying unit 340 outputs the input data packet as it is to branch unit 306 through the path (5) in the figure. If the instruction code OP stored in the input data packet is a two operand instruction requiring two operand data, that is, if it is necessary to wait for the input of the other operand data at the matching memory 344, instruction code identifying unit 340 transmits the input data packet to address computing unit 340 through the path (6) in the figure. Address computing unit 342 computes at which address in matching memory 344 one operand data is to be waited, based on the content of the destination field (destination cluster number field, which will be described later) of the given data packet. The address of matching memory 344 is designated through the path (7) in the figure, based on the computed address. If data has been already stored in the designated address, it means that a paired data is detected. Upon detection of the paired data, operand data stored in the designated address is read, and written to a data field of the input data packet. The data packet having two operand data stored is transmitted to branch unit 306 through the path (8) of the figure.

If data is not stored in the designated address of matching memory 344, the cluster number and the operand data stored in the input data packet are written at the designated address in area (9) of the figure. The written data is kept waiting for the input of the data packet storing the operand data to be paired.

For computing in address computing unit 342, the cluster number CB stored in the input data packet is used. As the method of address computing, Address=Func (cluster number)

is used. The function Func is an arbitrarily function with the cluster number being a factor. The function Func can be changed as desired. If address width for designating an arbitrary area in the matching memory 344 has 5 bits and the cluster number CB has 8 bit width, the address is provided by exerting logical mask (00011111) of 5 bits on the cluster number (for example, 10101010) as represented by the following expression.

(00011111).AND.(10101010)→00001010

By doing so, an address having a prescribed bit width suitable for the matching memory 344 can be generated even if the bit width of the cluster number CB is set arbitrarily.

Figure 18:
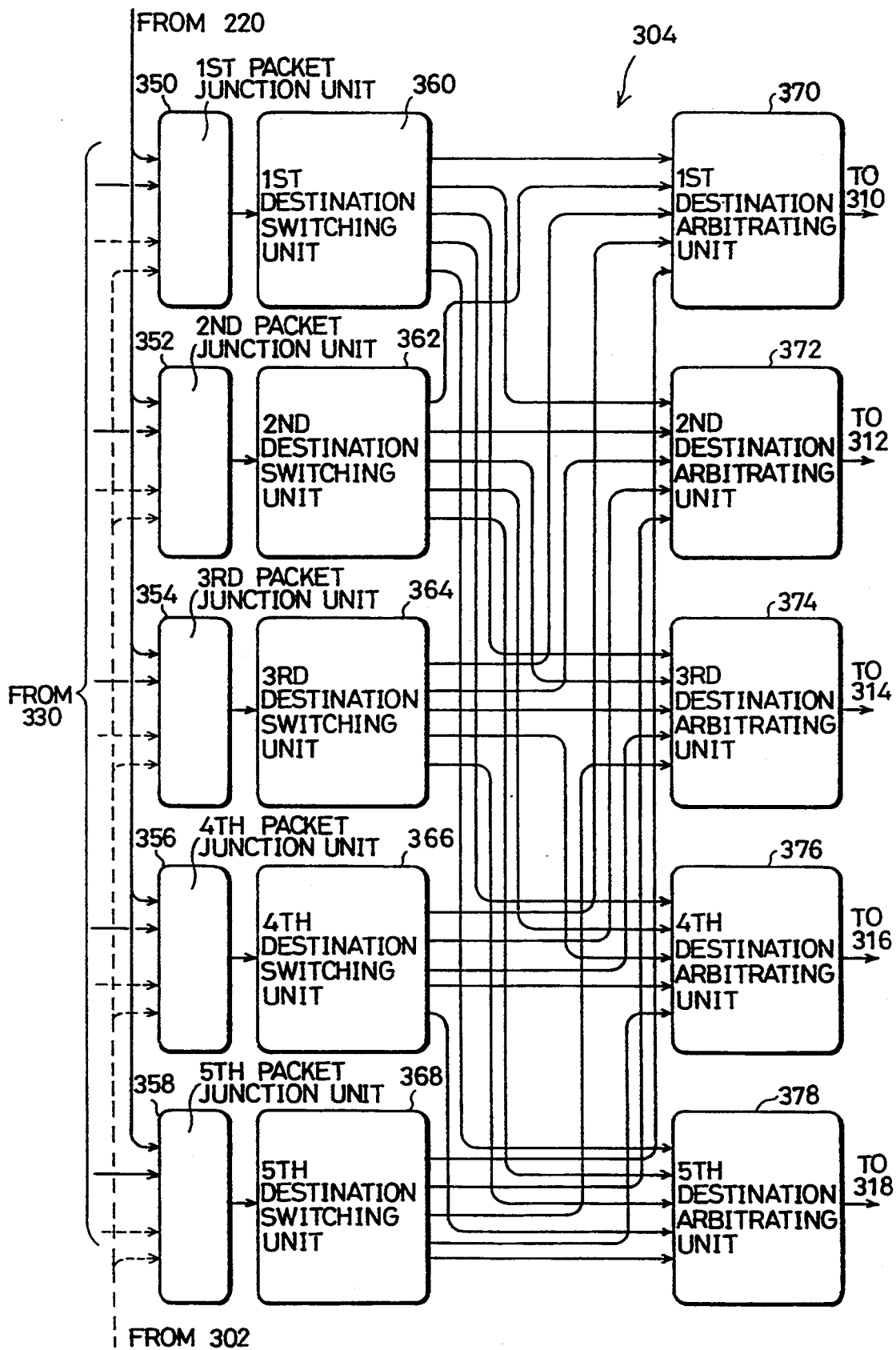
FIG. 18 is a block diagram of the junction unit of FIG. 16.

Referring to FIG. 18, junction unit 304 includes first to fifth packet junction units 350 to 358, first to fifth destination switching units 360 to 368 and first to fifth destination arbitrating units 370 to 378.

Packet junction units are separately provided corresponding to the number of program data read from program storing unit 1 per one access (in this embodiment, 5), each having the same internal structure. This also applies to the junction switching and the junction arbitrating units.

Each packet junction unit has two input ports and one output port. One input port is provided with a data packet transmitted from either program storing unit 220 or input unit 330. The other input port is provided with a data packet transmitted from either operation processing unit 302 or input unit 330. Each packet junction unit generates one packet from two data packets input through the input ports and transmits the same to a corresponding destination switching unit through the output port. Each packet junction unit arbitrates between a data packet applied externally through input unit 330 and an internally processed data packet. If the internally processed data packet contends with the externally applied data packet in any of the packet junction units, the internally processed data packet is transmitted with preference through the output port. The data packet, to which priority is not given, is kept waiting in an internal buffer, not shown, in the packet junction unit until no contender remains.

Each destination switching unit has one input port and five output ports. The first output port is connected to first destination arbitrating unit 370, the second output port is connected to the second destination arbitrating unit 372, the third output port is connected to the third destination arbitrating unit 374, the fourth output port is connected to the fourth destination arbitrating unit 376 and the fifth output port is connected to the fifth destination arbitrating unit 378.

Each destination switching unit selects any one of the five output ports based on the intra-cluster identification number CI stored in the input data packet. Since the input data packet is transmitted through the selected output port, the input data packet is transmitted to any of the first to fifth destination arbitrating units 370 to 378 according to the number CI stored therein. It is assumed that the number of types of intra-cluster identification number CI matches the number (5) of the destination arbitrating units.

Each destination arbitrating unit has five input ports and one output port. Five input ports of each destination arbitrating unit are connected to destination switching unit 360 to 368, respectively. Each destination arbitrating unit transmits the input data packet through the output port to the corresponding detecting unit of the paired data detecting unit 308 in a first-in, first-out manner. When data packets are simultaneously input to a plurality of input ports, each destination arbitrating unit selects with preference the input data packet having smaller cluster number stored therein, and transmits the same through the corresponding output port. The remaining data packets, which are not selected, are kept waiting in an internal buffer, not shown of each destination arbitrating unit until their remains no container.

Thus junction unit 304 generates five data packet in parallel, and selectively transmits each packet to any one of the first to fifth detecting units 310 to 318, in accordance with the destination intra-cluster identification number CI of the packet.

Figure 19:
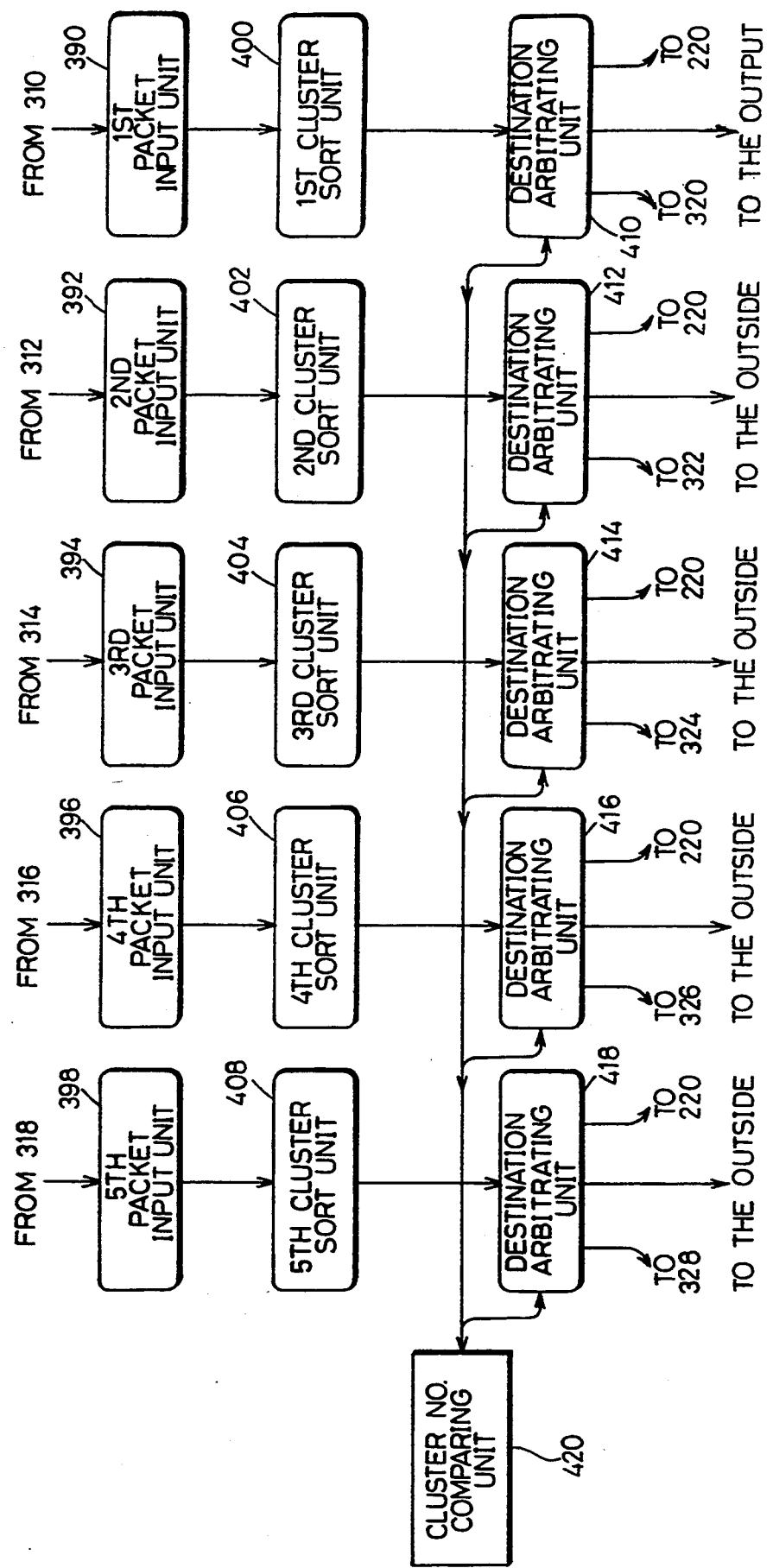
FIG. 19 is a block diagram of the branch unit of FIG. 16.

Referring to FIG. 19, branch unit 306 includes first to fifth packet input units 390 to 398, first to fifth cluster sorting units 400 to 408, first to fifth destination arbitrating units 410 to 418 and a cluster number comparing unit 420. Each packet input unit has one input port and one output port. Each cluster sorting unit has one input port and one output port. Each destination arbitrating unit has one input port and three output ports, and its operation is controlled by signal from cluster number comparing unit 420.

Branch unit 306 receives a data packet transmitted from paired data detecting unit 308 of the preceding stage, and outputs the input packet while sorting the input packet in accordance with the cluster number CB stored in the input packet. Branch unit 306 has a function of separating data stored in the packet to be output, transmitting the separated data to program storing unit 220 and to operation processing unit 302, and transmitting, if necessary, the packet outside the processor.

Each packet input unit receives the data transmitted from paired data detecting unit 308 and transmits the same to a corresponding cluster sorting unit through its output port. Each cluster sorting unit sorts the input data packet in accordance with the cluster number CB in ascending order, every time it receives the data packet transmitted from the corresponding packet input unit. More specifically, each cluster sorting unit includes an internal buffer and stores, for example, three packets in the buffer. Every time it receives a packet, each cluster sorting unit sorts the input packet and the three data packets which have been stored, in accordance with the cluster number mentioned above. As a result of sorting, the packet having the smallest cluster number is selected to be output through its output port. The data packet not selected are kept stored in the buffer, and sorting of data packets based on the cluster number is effected every time the subsequent data packet is received.

Each destination arbitrating unit receives the data packet output from the corresponding cluster sorting unit, which packet has been sorted in accordance with the cluster number, and outputs the data packet simultaneously with other destination arbitrating units, under control of the cluster number comparing unit 420.

Cluster number comparing unit 420 controls the destination arbitrating unit such that the cluster numbers stored in the data packets which are to be simultaneously output from the destination arbitrating units are the same. Cluster number comparing unit 420 reads and compares the cluster number CB stored in the data packet input to each destination arbitrating unit. Cluster number comparing unit 420 allows output operation only of the destination arbitrating unit which has received the data packet storing the same cluster number among the destination arbitrating units 420 to 428, so that packets storing the same cluster numbers are output simultaneously.

In FIG. 19, five destination arbitrating units are provided corresponding to the number of program data (5) read per one access from program storing unit 220. Therefore, under control of cluster number comparing unit 420, five data packets at most storing the same cluster number are simultaneously transmitted to operation processing unit 302. At this time, in order to read program data (5) of the next one cluster from program storing unit 220, one data packet storing only the cluster number which has been stored in the data packet output to operation processing unit 302 is transmitted to program storing unit 220. As a result of comparison at cluster number comparing unit 420, if it is determined that the number of data packets having the same cluster number CB is five or smaller, the number of data packets to be simultaneously transmitted to operation processing unit 302 is five or smaller. Control unit 420 also controls the arbitrating unit which is determined to receive the packet to be output externally, based on the result of comparison, such that the input packet is transmitted outside the processor.

Figure 20:
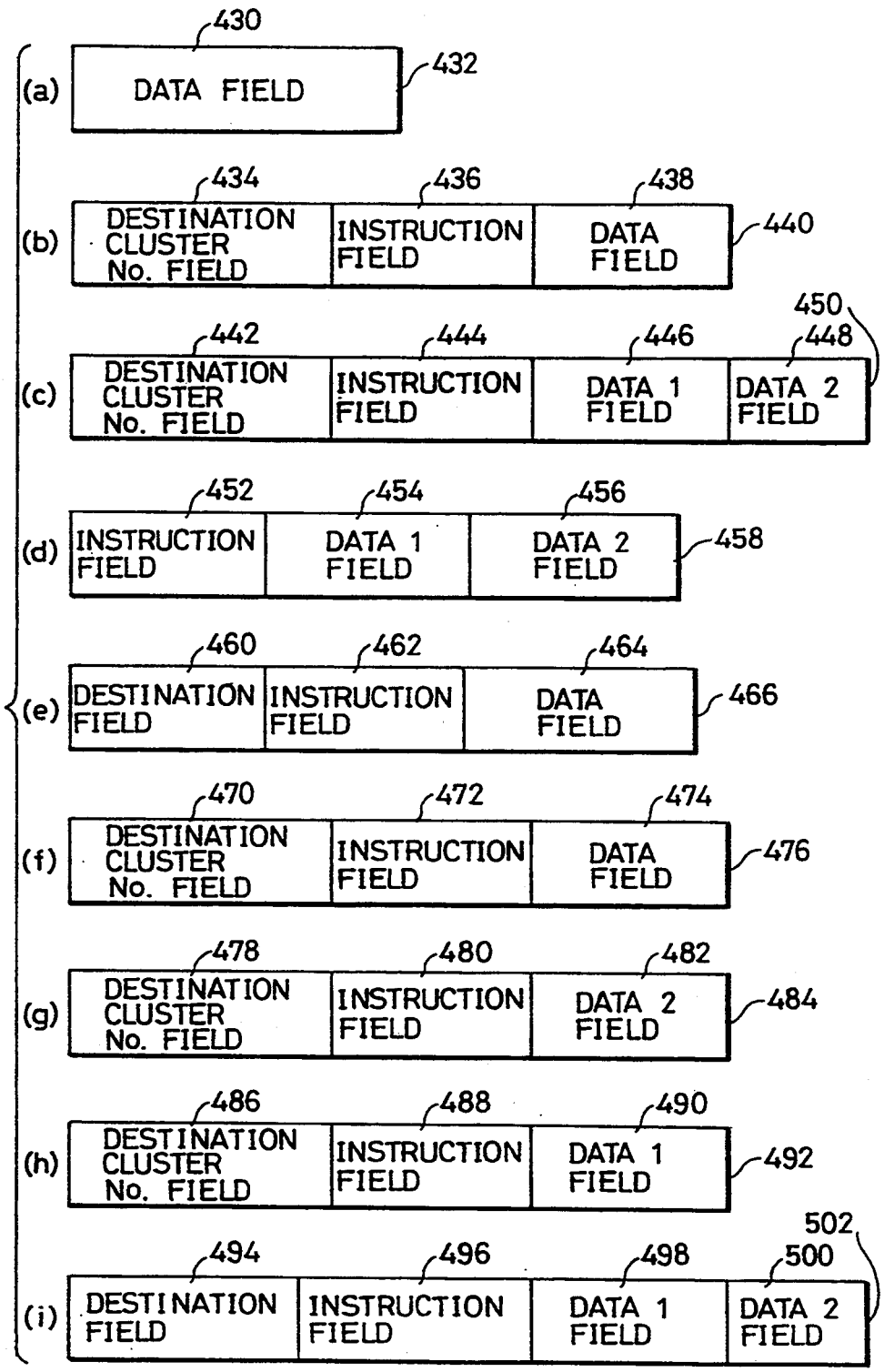
FIGS. 20 (a) to (i) show field structure of data packets flowing in the data driven type image processor shown in FIG. 16 during execution of a program.
Figure 21:
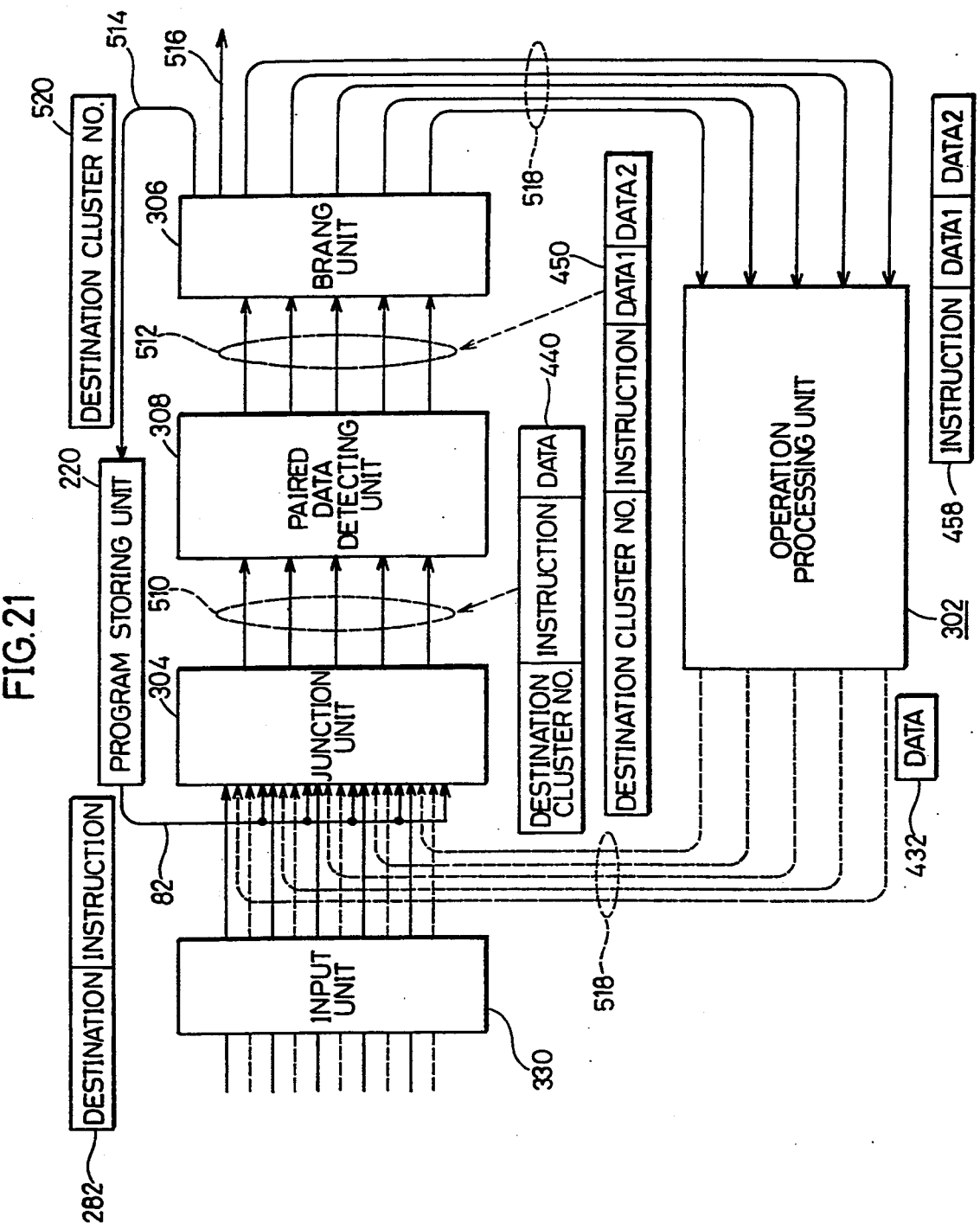
FIG. 21 shows an operation of the data driven type image processor shown in FIG. 16 during execution of a program along the flow of various data packets.

Referring to FIG. 21, a data transmission path 82 is connected to an output port of program storing unit 220. Data transmission path 82 is connected to one input port of first to fifth packet junction units 350 to 358. A data packet 282 is applied to data transmission path 82. Five data transmission paths 518 are connected to the output port of operation processing unit 302. Each data transmission path 518 is connected to the other input port of each of the first to fifth packet junction units 350 to 358. A data packet 432 including such a data field 430 as shown in FIG. 20 (a) is applied to data transmission path 518.

Five output ports of junction unit 304 are connected to the input port of each instruction code identifying unit 340 of first to fifth detecting units through data transmission path 510, respectively. A data packet 440 including a destination cluster number field 434 storing the next destination cluster number CB, an instruction field 436 and a data field 438 such as shown in FIG. 20 (b) is applied to the data transmission path 510.

Five output ports of paired data detecting unit 308 are connected to the input ports of the first to fifth packet input units 390 to 398 of branch unit 306 through data transmission path 512. A data packet 450 including a destination cluster number field 442, an instruction field 444, a data 1 field 446 and a data 2 field 448 such as shown in FIG. 20 (c) is applied to data transmission path 520. Each destination arbitrating unit of branch unit 306 has its first output port connected to an input port of program storing unit 220 through a data transmission path 512, its second output port connected to the outside of the processor through a data transmission path 516 and its third output port connected to an input port of a corresponding operation unit of operation processing unit 302 through a data transmission path 518. For simplicity of description, data transmission paths 514 and 516 are not shown in FIG. 21. One data packet 520 storing only the destination cluster number CB is applied to data transmission path 514. The data packet applied to data transmission path 516 will be described later. A data packet 458 including an instruction field 452, a data 1 field 454 and a data 2 field 456 such as shown in FIG. 20 (d) is applied to data transmission path 518.

Referring to FIGS. 16 to 24, the data driven type information processor in accordance with the second embodiment operates in the following manner.

Figure 22:
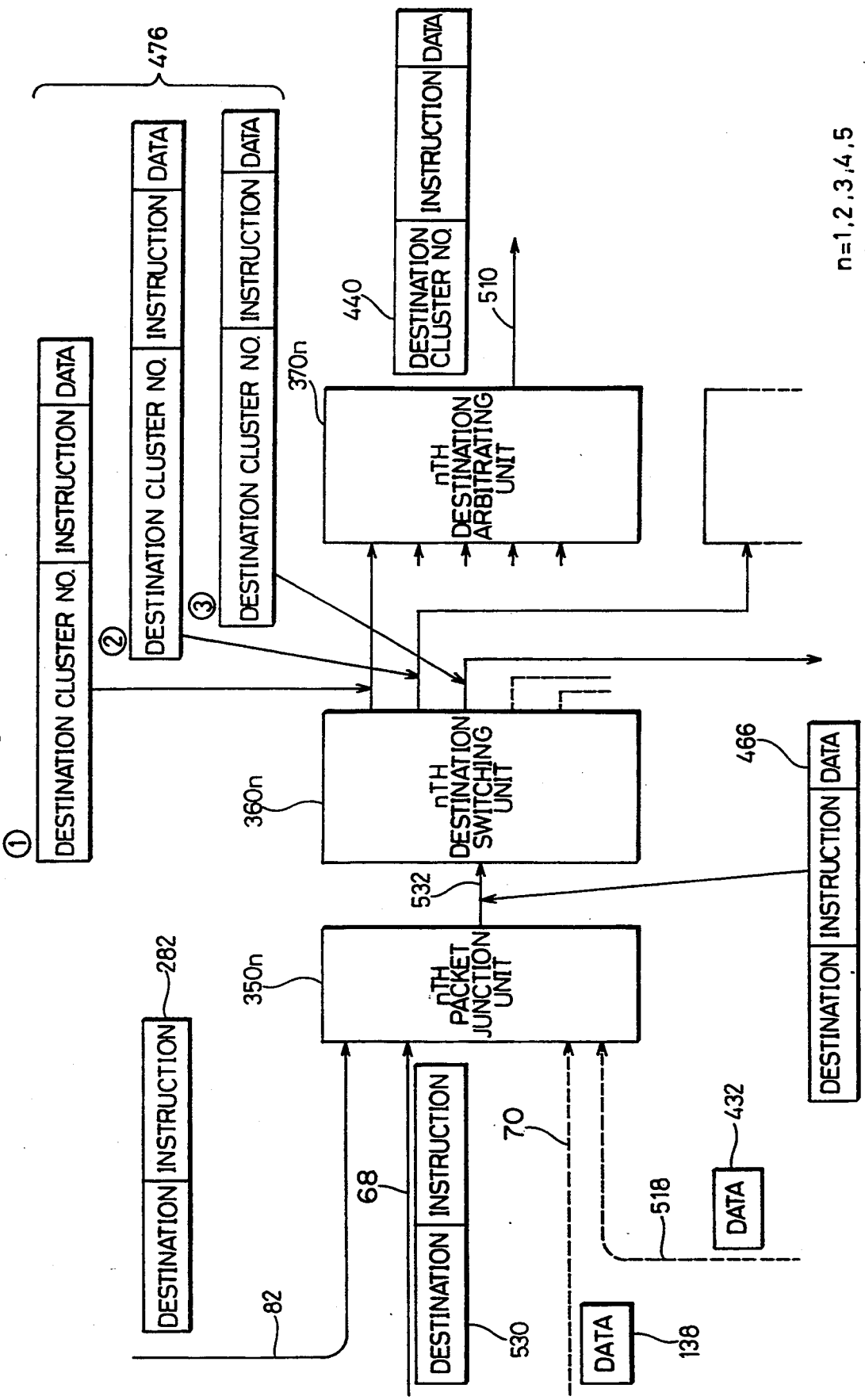
FIG. 22 shows an operation at the junction unit of the data driven type image processor shown in FIG. 16 data execution during execution of a program along the flow of various data packets.

At first, a set of data packets 278 and 138 as well as four packets 138 are input to input unit 330. The one set of data packets 278 and 138 are respectively transmitted to two input ports of the first packet junction unit 350 through transmission paths 68 and 70, as shown in FIG. 22. Other packets 138 are applied to one input port of each of junction units 352 to 358, respectively. The first packet junction unit 350 changes these packets 278 and 138 to a data packet 466 which includes a destination field 460, an instruction field 462 and a data field 464 such as shown in FIG. 20 (e) and transmits the same to the first destination switching unit 360. The first destination switching unit 360 determines an output port in accordance with the destination intra-cluster identification number CI stored in the destination field of the input data packet 466. The first destination switching unit 360 changes the data packet 466 into a data packet 476 including a destination cluster number field 470, an instruction field 472 and a data field 474 such as shown in FIG. 20 (f) and transmits the same to a corresponding destination arbitrating unit through the determined output port. At this time, if the destination intra-cluster identification number CI stored in the data packet 466 is 1, the data packet is transmitted to the first destination arbitrating unit 370. If the number CI is 2, 3, 4 or 5, the data packet is transmitted to the second, third, fourth, or fifth destination arbitrating unit 372, 374, 376 or 378, respectively. The destination arbitrating unit which has received data packet 476 changes the input data packet into a data packet 440 and transmits the same to a corresponding detecting unit of paired data detecting unit 308.

Instruction code identifying unit 340 of the detecting unit which has received the aforementioned packet 440 transmits the data packet as it is to the corresponding packet input unit of address computing unit 342 or to branch unit 306 based on the instruction code OP stored in the received data packet 440. If it is identified that the instruction code OP stored in the data packet 440 is a two operand instruction, for example, the data packet is transmitted to address computing unit 342. Address computing unit 342 computes an address for accessing matching memory 344, based on the destination cluster number CB stored in the input data packet 440. Based on the computed address, if a paired data is detected as a result of accessing the address of the memory 314, a data packet 450 storing two operand data to be paired is transmitted through transmission path 512. If matching data is not stored in the designated address, contents of the cluster number and the data field stored in the input packet 440 are written to the area of the designated address to wait for the input of the data to be paired.

Figure 23:
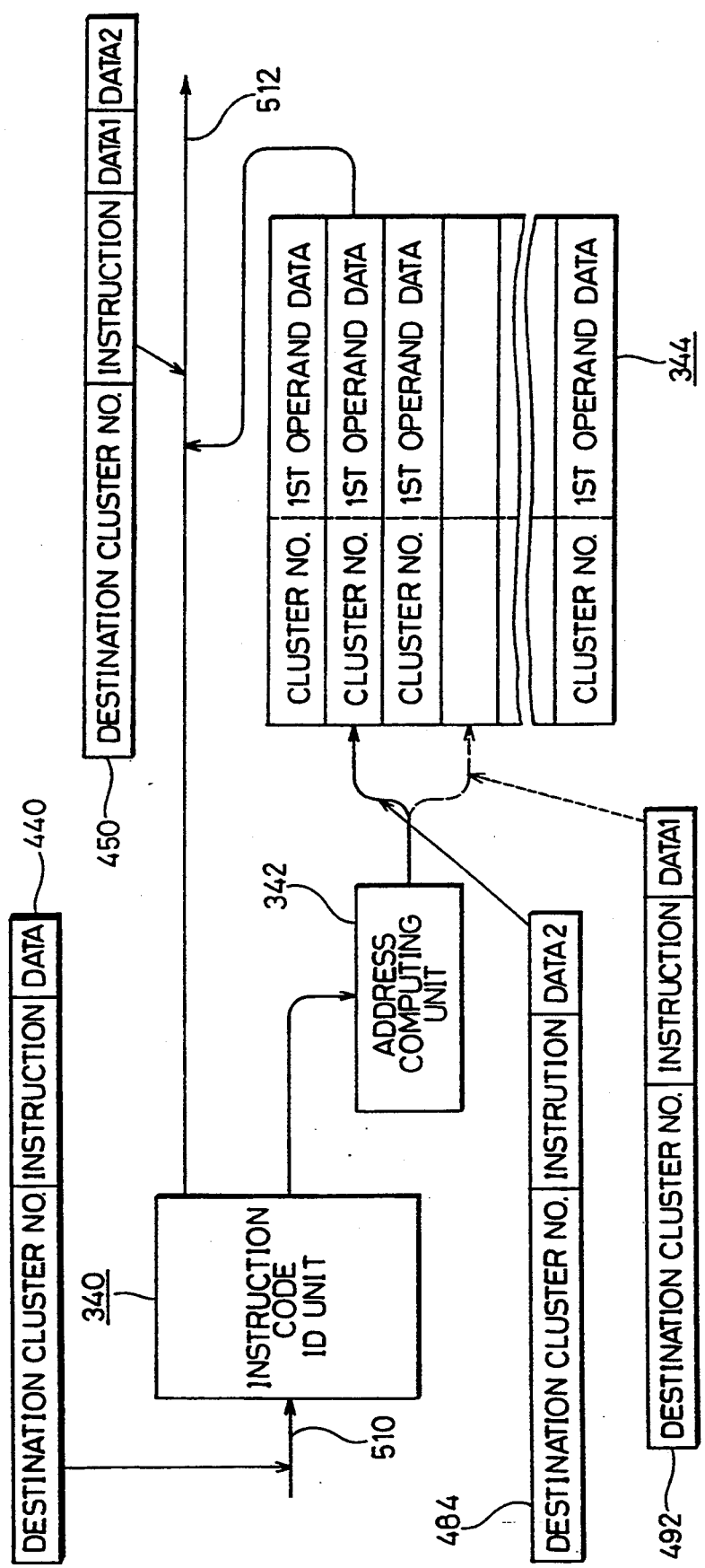
FIG. 23 shows the operation at the paired data detecting unit in the data driven type image processor shown in FIG. 16 during execution of a program along the flow of various data packets.

Details of the paired data detection in matching memory 344 is shown in FIG. 23. When paired data is detected as a result of accessing matching memory 344 and data packet 450 storing two operand data OPD1 and OPD2 is transmitted, the data packet which has accessed matching memory 344 is the data packet 484. Data packet 484 includes a destination cluster number field 478, an instruction field 480 and a data 2 field 482 storing the second operand data OPD2, as shown in FIG. 20 (g). If matching data is not stored in the designated address, the data packet which accesses the designated address is the data packet 492. Data packet 492 includes a destination cluster number field 486, an instruction field 488 and a data 1 field 490 storing the first operand data OPD1, as shown in FIG. 20 (h).

If it is identified in instruction code identifying unit 340 that the instruction code stored in data packet 440 is a one operand instruction, the operand data stored in data packet 450 to be transmitted is either the first or second operand data.

Figure 24:
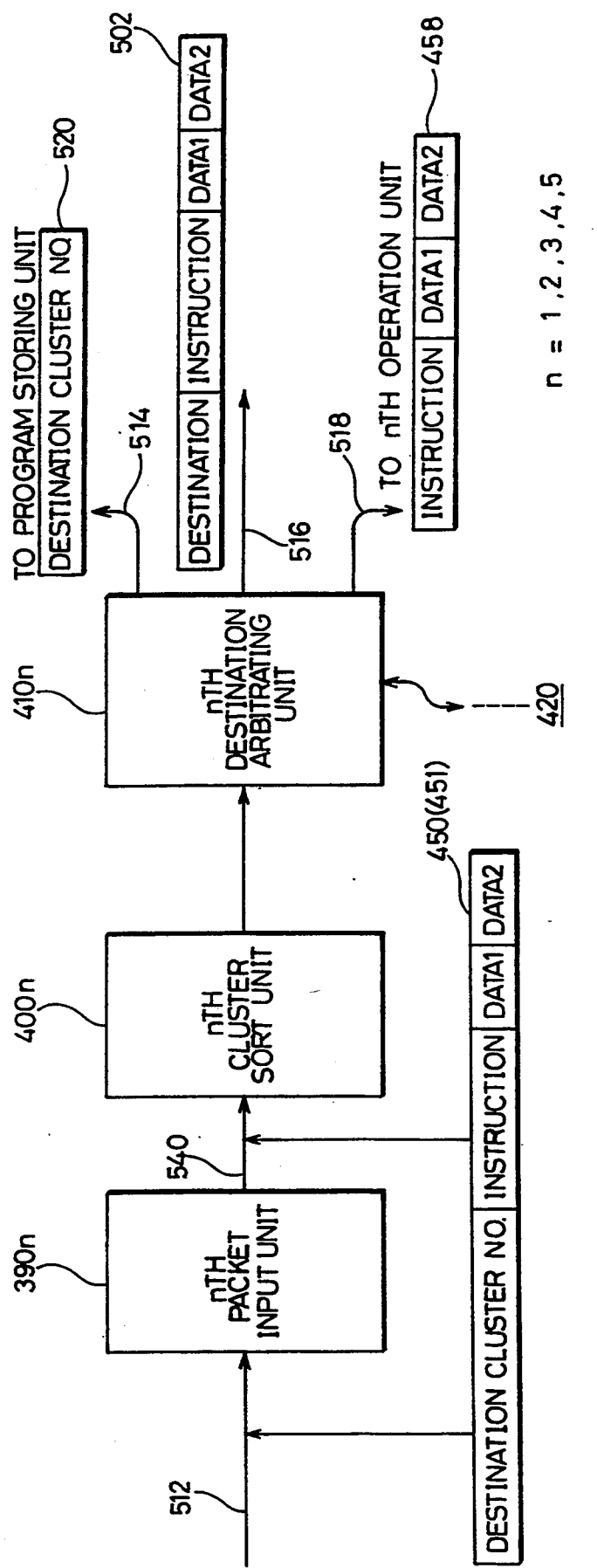
FIG. 24 shows an operation at the branch unit of the data driven type image processor shown in FIG. 16 during execution of a program along the flow of various data packets.

Data packet 450 transmitted through transmission path 512 is applied to the corresponding packet input unit of branch unit 306. Referring to FIG. 24, the packet input unit receives packet 450, changes it into data packet 451 through transmission path 540 and transmits the same to the corresponding cluster sorting unit. The cluster sorting unit sorts the input data packet 451 in accordance with the cluster number and transmits the same to the corresponding destination switching unit. Destination arbitrating unit 410 transmits, when it is determined that the input data packet 451 is the data packet to be externally output under control of comparing unit 420, a data packet 502 including a destination field 494, an instruction field 496, a data 1 field 498 and a data 2 field 500 such as shown in FIG. 20 (*i*) through transmission path 516. In the similar manner, when input data packet 451 is determined to be a packet for internal processing, destination arbitrating unit 410 separates data packet 451 into a data packet 520 and 458. Data packet 520 stores only the destination cluster number CB which has been stored in packet 451. Data packet 458 stores the contents of instruction field, data 1 field and data 2 field of packet 451. Data packet 520 is applied to an input port of memory access unit 232 of program storing unit 220 through a transmission path 514. Data packet 458 is applied to an input port of the corresponding operating unit of operation processing unit 302 through a data transmission path 518.

Since the nth destination arbitrating unit knows by itself to which intra-cluster identification number it corresponds, and therefore the intra-cluster identification number can be added to the destination field of the packet 502.

The memory access unit 232 of program storing unit 220 receives data packet 520, and simultaneously and individually accesses each of the banks of memory bank unit 234 based on the destination cluster number CB stored in the packet 520. By this access, program data (five program data) of designated one cluster in the data flow program 240 (see FIG. 13) are simultaneously read from each bank, which data are applied to packet generating unit 236. Generating unit 236 generates a data packet 282 from each data in a first-in, first-out manner, and the generated data packet is applied to one input port of each packet junction unit. At this time, five data packets 282 are applied to each packet junction unit in the order of reading from program storing unit 220 (in the order of intra-cluster identification number). In operation processing unit 302, operation processing is effected on data packet 458. A data packet 432 storing the result thereof is applied to the other input port of the corresponding packet junction unit of junction unit 304 through transmission path 518.

At the packet junction unit 350n of the junction unit 304 receiving the packet 432 from the operation processing unit 302, data packet 282 read from program storing unit 220 and is merged with data packet 432. At each of the remaining packet junction units of junction unit 304, data packet 282 read from program storing unit 220 is merged with a data packet 138 applied in advance through input unit 330. Each packet junction unit changes the input two data packet into a data packet 466 and transmits the same to data transmission paths 532. At this time point, a destination information of the operand data of data packet 138 input through input unit 330 and of operand data stored in data packet 432 transmitted from operation processing unit 302 are updated by using the destination information stored in data packet 282 read from program storing unit 220.

Data packet 466 transmitted from each packet junction unit is applied to the corresponding destination switching unit. Each destination switching unit determines the output ports based on the destination intra-cluster identification number CI stored in data packet 466, and outputs the packet 466 as a packet 476 through the determined output port. Each destination switching unit transmits data packet 476 as a data packet 440 in the first-in, first-out manner to transmission path 510. At this time, when packets 466 are input simultaneously from a plurality of destination switching units, each destination arbitrating unit selects the packet 476 storing smaller destination cluster number CB and transmits the same as a packet 440 to transmission path 510. Remaining packets which are not selected are kept waiting in an internal buffer of the destination arbitrating unit.

Each detecting unit of paired data detecting unit 308 receives data packet 440 through transmission path 510. Instruction code identifying unit 340 of each detecting unit identifies the instruction code in the input packet 440, and if it is a one-operand instruction, it transmits this directly to branch unit 306 through transmission path 512. If the instruction code is a two operand instruction, the packet 440 is transmitted to address computing unit 342.

Address computing unit 342 computes an address based on the destination cluster number CB stored in packet 440 and designates the address in memory 344. It is determined whether a data packet 450 is to be generated and output or data stored in packet 440 is to be written to the area of the designated address to wait for an input of the data to be paired, dependent on whether data is written in the designated address of the memory 344. The data packet transmitted from each detecting unit is applied to a packet input unit of the corresponding branch unit 306 through transmission path 512. Among the packet input units of branch unit 306, each packet input unit to which the data packet 450 is input through transmission path 512 transmits the input packet as packet 451 to a transmission path 540.

Among five cluster sorting units of branch unit 306, that sorting unit which has received the packet 451 operates in the following manner. First, in response to the input of packet 451, it sorts the packet 451 and three data packets which it has received and stored in ascending order, in accordance with the cluster number CB. By this sorting, a packet having the smallest cluster number CB is selected, and the selected packet is transmitted to the corresponding destination arbitrating unit. If there is no packet stored in the internal buffer, the packet 451 is directly transmitted to the corresponding destination arbitrating unit.

Among the five cluster sorting units, that sorting unit which has not received packet 451 selects, out of the plurality of packets which have been already sorted in the internal buffer, a packet which has the smallest cluster number CB, and transmits the selected packet to the corresponding destination arbitrating unit. Thus five data packets are transmitted to the corresponding destination arbitrating units at one time from cluster sorting units 400 to 408.

Upon reception of a data packet from a corresponding cluster sorting unit, each destination arbitrating unit of branch unit 306 reads the cluster number CB stored in the packet and transmits the same to cluster number comparing unit 420. Comparing unit 420 compares a plurality of cluster numbers CB input thereto, and controls output operation of each destination arbitrating unit such that packets having smaller numbers CB are output sequentially and that packets storing the same cluster number CB are transmitted simultaneously, based on the result of comparison. At this time, based on the destination cluster number CB of the data packet to be output from each destination arbitrating unit, whether or not the packet is to be output externally is determined. If it is determined that the packet is to be externally output, the packet is transmitted to transmission path 516 as packet 502. If the packet is determined to be a packet to be internally processed, the packet is separated into a packet 520 and a packet 458, which packet 520 is transmitted to program storing unit 220 through transmission path 514 and packet 458 is transmitted to the corresponding operation unit through transmission path 518. When packet 520 is output, only one packet 520 is output by the control of cluster number comparing unit 420.

In this manner, since the packets are output in ascending order of the cluster number and the packets having the same cluster number are transmitted simultaneously from the branch unit 306, when the number of packets having the same cluster number is smaller than 5, packets 458 the number of which is smaller than 5 are applied to operation processing unit 302.

Program storing unit 220 receives the packet 520, and reads program data (next destination information and next instruction information) of one cluster (5 data) as a packet 282 from the program 240, in accordance with address designation based on the cluster number CB stored therein. Program storing unit 220 transmits packets 282 to packet junction units 350 to 358 of junction unit 304 in the order of reading (in accordance with the number of destination intra-cluster identification number).

Each operation unit which has received packet 458 of operation processing unit 302 simultaneously and individually carries out operation processing on the input packet 458. The operation units transmit in parallel, data packet 432 storing the result of operation, respectively, which data packets are applied to the corresponding packet junction units at the junction unit 304. Among the packet junction units at the junction unit 304, those packet junction units which received packets 282 and 432 transmit the two packets as one data packet 440. At this time, destination information (destination cluster number and destination intra-cluster identification number) of the operand data stored in packet 432 is updated by the next destination information read from program storing unit 220.

As described above, the data flow program 240 stored in program storing unit 220 is read on cluster basis, while operation processing in accordance with the read program data proceeds.

In this embodiment, as a method of starting execution of the program in the data driven type information processor, a method is employed in which one packet 278 for reading the program data from program storing unit 220 and five packets 138 for generating a packet 466 in combination with the program data read from the storing unit 220 by the packet 278 are externally supplied to input unit 330. However, the present invention is not limited thereto. For example, a method in which five packets 278 and five packets 138 for generating a packet 466 in combination with each of the packets 278 are externally supplied through input unit 330 simultaneously may be employed.

As described above, in the data driven type information processor according to the second embodiment, one cluster of program data, that is, five program data are read per one access to program storing unit 220. The operand data to be paired is detected in paired data detecting unit 220 and operation instruction is executed in operation processing unit 302 individually and simultaneously for respective ones of the read five program data, and therefore the process rate of the program 240 in the processor is improved to be about five times that of the prior art at most, and it is not below the prior art even in the worst case.

Figures 25, 26:
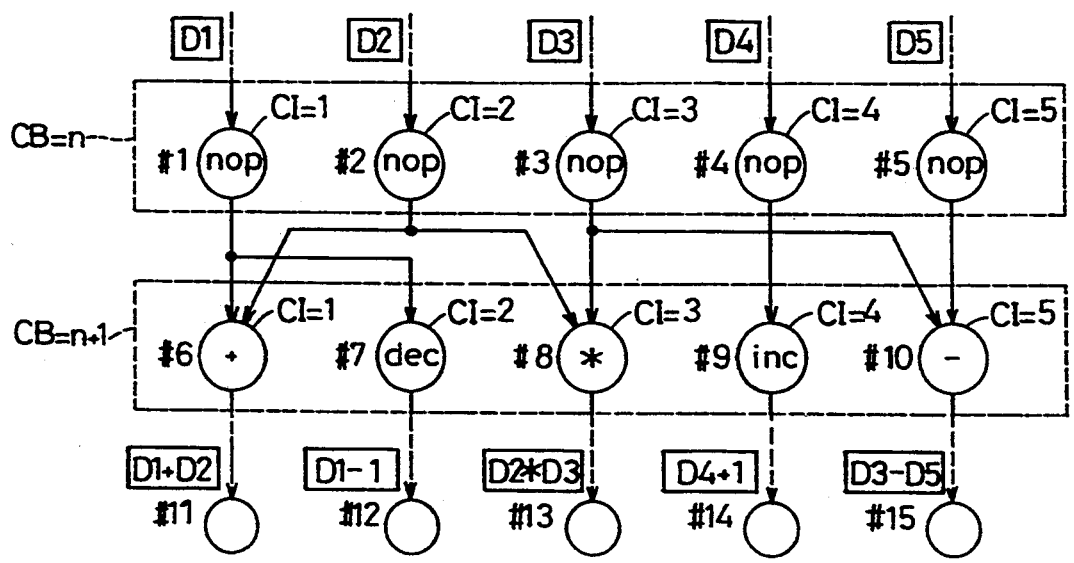
FIG. 25 shows an example of a data flow program executed in the data driven type image processor shown in FIG. 16.
FIG. 26 is a data flow graph showing the program of FIG. 25.

FIG. 25 shows an example of a data flow program executed in the data driven type information processor shown in FIG. 16.

FIG. 26 shows the program of FIG. 25 in the form of a data flow graph.

A circular mark in the flow graph of FIG. 25 is called a node in which an operation.processing instruction is described. Nodes are denoted by node numbers #1, #2, #3, . . . . The node number indicates destination information (destination cluster number CB+destination intra-cluster identification number CI). A group of nodes which can be executed in parallel among these nodes are collected in one cluster. Therefore, the nodes #1 to #5 of FIG. 26 are collected in 1 cluster of CB=N, nodes #6 to #10 are collected in 1 cluster of the cluster number CB=N+1, and the nodes #11 to #15 are collected in the next 1 cluster.

Among the operation instructions, nop represents no operation, that is, the input data is kept as it is without any operation to be output, the reference character * indicates multiplication, + indicates addition, inc represents increment by one the value of input data, dec represents decrement by 1 the value of input data, and the reference character − represents the subtraction operation.

The data flow program 550 of FIG. 25 is stored in the memory bank unit 234 of program storing unit 220. The memory bank unit 234 has an address space of the size which can be designated by the destination cluster number CB stored in the data packet 520, and stores the cluster number Cb, intra-cluster identification number Ci and an operation code Op as shown in FIG. 13 corresponding to each address. The instruction code Op further includes an operation.processing instruction code cm1, a corresponding destination information cm2, that is, a code indicating whether the instruction of the node having the next node number is a left input or a right input, and a copy flag (copy present/absent information) f. If the copy flag f is 0, only the program data stored in the address is read. If the copy flag f is 1, the program data stored in the next address is read following the program data stored in the address.

Referring to FIGS. 16 to 25, the data driven type information processor operates in accordance with the flow graph shown in FIG. 26, in the following manner.

When the instructions of the nodes #1 to #5 of FIG. 26 are executed, five data packets 282 respectively storing the program data read in parallel from the program storing unit 220 are transmitted to junction unit 304 in the order of reading. At the same time, five data packets 432 storing respective results of operations at operation units are transmitted from operation processing unit 302 to junction unit 304. As for the five data packets 282, in the first packet, n is stored as the cluster number, 1 is stored as the intra-cluster identification number and nop is stored as the instruction code, and the first packet is applied to one input of the packet junction unit 350 of junction unit 304. As for the second packet 282, n is stored as the cluster number, 2 is stored as intra-cluster identification number, nop is stored as the instruction code, and the second packet is applied to one input of the packet junction unit 352. As for the third packet 282, n is stored as the cluster number, 3 is stored as the intra-cluster identification number, npo is stored as the instruction code, and the third packet is applied to one input of packet junction unit 354. As for the fourth packet 282, n is stored as the cluster number, 4 is stored as the intra-cluster identification number, nop is stored as the instruction code, and it is applied to one input of packet junction unit 356. As for the fifth packet 284, n is stored as the cluster number, 5 is stored as the intra-cluster identification number, nop is stored as the instruction code, and it is applied to one input of packet junction unit 358.

A data packet 432 storing T1 as an operand data is transmitted from operation unit 320, and it is applied to the other input of packet junction unit 350. A packet 432 storing D2 as the operand data is transmitted from operation unit 322 and applied to the other input of packet junction unit 352. A packet 432 storing D3 as the operand data is transmitted from operation unit 324 and applied to the other input of packet junction unit 354. A data packet 432 storing D4 as the operand data is transmitted from operation unit 326 and applied to the other input of packet junction unit 356. A data packet 432 storing D5 as the operand data is transmitted from operation unit 328 and applied to the other input of packet junction unit 358.

At each packet junction unit, each destination switching unit and at each destination arbitrating unit of junction unit 304, both of the input data packets described above are sequentially processed, and five data packets 440 are respectively transmitted to the corresponding instruction code identifying unit 340 of the paired data detecting unit 304. Each of the data packet 440 stores n as the cluster number and nop as the instruction. D1 is stored as the data in output packet 440 at the arbitrating unit 370, data D2 is stored in the packet at the arbitrating unit 372, D3 is stored in the packet at the arbitrating unit 372, data D4 is stored in the packet at the arbitrating unit 376, and data D5 is stored in the packet at arbitrating unit 378. At each instruction code identifying unit 340 of paired data detecting unit 308, the instruction code nop stored in the received data packet 440 is identified as one operand instruction, and therefore input packet 440 is directly transmitted as packet 450 to branch unit 306.

Each packet input unit, each cluster sorting unit and each destination arbitrating unit of branch unit 306 sequentially process the input data packet 440 and transmit the same to a corresponding operation unit of operation processing unit 302. Therefore, a packet 458 storing nop as the instruction code and D1 as the data is applied to operation unit 320, a data packet 458 storing nop as the instruction code and D2 as the data is applied to operation unit 352, a packet 458 storing nop as the instruction code and D3 as the data is applied to the operation unit 324, a packet 458 storing nop as the instruction code and D4 as the data is applied to operation unit 326, and a packet 458 storing nop as the instruction code and D5 as the data is applied to operation unit 328, respectively.

While the data packets 458 are transmitted to respective operation units, one packet 520 storing n as the destination cluster number is transmitted, for example, from destination arbitrating unit 410 to program storing unit 420. Program storing unit 420 reads in parallel all the program data included in cluster n of program 550 of FIG. 25 from each of the banks of memory bank unit 234, by address designation based on the cluster number (=n) stored in the input packet 520. At this time, the program data read is data for executing instructions of the second nodes #6 to #10 of the flow graph shown in FIG. 26, and the data include next destination information and next information code, respectively.

The program data read from program storing unit 220 is respectively applied to one input of each packet junction unit of junction unit 304 in the order of reading. Since program data (1) of FIG. 25 is read at first, data packet 282 having 2 stored at the next cluster number, each stored as the intra-cluster identification number, and + left input and copy flag stored as the instruction code is input to one input of the first packet junction unit 350. At this time, since the copy flag f is "1", the program data stored in the next address is continuously read, and data packet 282 storing 2 as the next cluster number, 2 as the intra-cluster identification number and dec as the instruction code is transmitted to one input of the first packet junction unit 350. Therefore, when copying operation is done in accordance with the copy flag f mentioned above, two data packets 282 are continuously applied to one input of the corresponding packet junction unit.

Then, the program data (2) of FIG. 25 is read. Since the copy flag f corresponding to this program data is also "1", the program data stored in the next address is continuously read. Therefore, a data packet 282 storing 2 as the next cluster number, 1 as the intra-cluster identification number, a + write input and a copy flag as instruction code is applied to one input of the second packet junction unit 352, followed by a data packet 282 storing 2 as the next cluster number, 3 as the intra-cluster identification number and * left input as the instruction code. Then, program data (3) of FIG. 25 is read. Since the copy flag f corresponding to this program data is also "1", the program data stored in the next address is read continuously. Therefore, data packet 282 storing 2 as the next cluster number, 3 as the intra-cluster identification number, * right input and a copy present as instruction code is transmitted to one input of the third packet junction unit 354 followed by a data packet 282 storing 2 as the next cluster number, 5 as the intra-cluster identification number, and − left input as the instruction code.

Then, program data (4) of FIG. 25 is read. Therefore, a data packet 282 storing 2 as the next cluster number, 4 as the intra-cluster identification number, and inc as the instruction code is applied to one input of the fourth packet junction unit 356. Then, finally, the program data (5) of FIG. 25 is read. Therefore, a data packet 282 storing 2 as the next cluster number, 5 as the intra-cluster identification number, and − right input as the instruction code is applied to one input of the fifth packet junction unit 358.

Meanwhile, at each operation unit of the operation processing unit 302, when instruction code stored in the input data packet 458 is nop, no operation processing is done and the data packet is directly applied to the corresponding packet junction unit of the junction unit 304 as a data packet 432. Therefore, data packet 432 storing data D1 to D5 respectively are applied to the other input of each of the packet junction units 350 to 358.

Each packet junction unit of junction unit 304 merges input packets 286 and 432, and transmits the packet 466 to a corresponding destination switching unit. If an instruction indicating "copy present" is stored in the instruction code of input packet 282, each packet junction unit maintains the data packet 432 applied to the other input until the next packet 282 is input.

More specifically, for example, the first packet junction unit 350 transmits a packet 466 storing n+1 as cluster number, 1 as the intra-cluster identification number, + left input as the instruction code and D1 as the data to destination switching unit 360 in response to reception of the first packet 282. Thereafter, the first packet junction unit 350 transmits a packet 466 storing n+1 as the cluster number, 2 as the intra-cluster identification number, dec as the instruction code and D1 as the data to switching unit 360, in response to reception of the second data packet 282.

Junction unit 352 transmits a packet 466 storing n+1 as the cluster number, 1 as the intra-cluster identification number, + right input as the instruction code and D2 as the data to switching unit 362 in response to reception of the first packet 282, and transmits a packet 466 storing n+1 as the cluster number, 3 as the intra-cluster identification number, * left input as the instruction code and D as the data to switching unit 362, in response to the successive reception of the second packet 282.

Junction unit 354 transmits a data packet 466 storing +1 as the cluster number, 3 as the intra-cluster identification number, * right input as the instruction code and D3 as the data to switching unit 364 in response to reception of the first data packet 282, and transmits a data packet 466 storing n+1 as the cluster number, 5 as the intra-cluster identification number, − left input as the instruction code and D3 as the data to switching unit 364 in response to the successive reception of the second data packet 282.

Junction unit 356 transmits a data packet 466 storing n+1 as the cluster number, 4 as the intra-cluster identification number, inc as the instruction code and D4 as the data to switching unit 366 in response to reception of packet 282, and junction unit 358 transmits a packet 466 storing n+1 as the cluster number, 5 as the intra-cluster identification number, − right input as instruction code and D5 as the data to switching unit 358 in response to reception of packet 282.

Each destination switching unit transmits the packet 466 as packet 476 to any of the destination arbitrating units 370 to 378 based on the intra-cluster identification number stored in the received packet 466.

Each destination arbitrating unit transmits the applied data packets 476 to corresponding instruction code identifying unit 340 of paired data detecting unit 308 as packet 440 in order. Therefore, the first destination arbitrating unit 370 outputs a packet 440 storing n+1 as the cluster number, + left input as the instruction code and D1 as the data and thereafter a packet 440 storing n+1 as the cluster number, + right input as the instruction code and D2 as the data. The second destination arbitrating unit 370 outputs a packet 440 storing n+1 as the cluster number, dec as the instruction code and D1 as the data. The third destination arbitrating unit 374 outputs a packet 440 storing n+1 as the cluster number, * left input as the instruction code and D2 as the data, and then a packet 440 storing n+1 as the cluster number, * right input as the instruction code and D3 as the data. The fourth destination arbitrating unit 376 outputs a packet 440 storing n+1 as the cluster number, inc as the instruction code and D4 as the data. The fifth destination arbitrating unit 378 outputs a packet 440 storing n+1 as the cluster number, − left input as the instruction code and D3 as the data, and then a data packet 440 storing n+1 as the cluster number, − right input at the instruction code D5 as the data.

Each instruction code identifying unit 340 of paired data detecting unit 308 identifies the instruction code stored in the data packet 440 and if the instruction code is a one-operand instruction code, applies the packet 440 directly to branch unit 306 as a packet 450. If the instruction code is a two-operand instruction code, the corresponding address computing unit 342 and the matching memory 344 detects paired data, and applies a data packet 450 including the paired data to branch unit 306. By this processing at the paired data detecting unit 308, one or two operand data necessary for executing instruction corresponding to the nodes #6 to #10 in the flow graph of FIG. 26 can be detected. A packet 450 related to node #6 is applied to the first packet input unit 390 of branch unit 306, a data packet 450 related to node #7 is applied to the second packet input unit 392, a data packet 450 related to node #8 is applied to the third packet input unit 394, a packet 450 related to node #9 is applied to the fourth packet input unit 396 and a packet 450 related to node #10 is applied to the fifth packet input unit 398, respectively. Each data packet 450 is sequentially processed in the corresponding packet input unit, cluster sorting unit and destination arbitrating unit. Each destination arbitrating unit transmits data packet 458 to a corresponding operation unit of operation processing unit 302. At this time, only one data packet 520 storing the destination cluster number n+1 is applied to program storing portion 220 from destination arbitrating unit 370, for example.

Referring to FIG. 21, operation processing is carried out in parallel with respect to the input packet 458 at each operation unit of the operation processing unit 302. Packets storing the result of operations are transmitted from respective operation unit to the corresponding packet junction units of the junction unit 304. More specifically, referring to FIGS. 16 and 21, the first operation unit 320 receives a packet 458 storing + as the instruction code and D1 and D2 as data, carries out operation processing with respect to the input packet, and applies a packet 432 storing the result of operation (D1+D2) to junction unit 350. The second operation unit 322 receives a packet 458 storing dec as the instruction code and D1 as the data, carries out operation processing and applies a packet 432 storing the result of operation (D1−1) to the second packet junction unit 352. The third operation unit 324 receives a packet 458 storing * as the instruction code and D2 and D3 as the data, and applies a packet 432 storing the result of operation (D2*D3) to the third packet junction unit 354. The fourth operation unit 326 receives a packet 458 storing inc as the instruction code and D4 as the data, and applies a packet 432 storing the result of operation (D4+1) to the fourth packet junction unit 356. The fifth operation unit 328 receives a packet 458 storing − as the instruction code and D3 and D5 as the data and applies a packet 432 storing the result of operation (D3−D5) to the fifth packet junction unit 358.

In this manner, at the operation units of the operation unit 302, operation processing of nodes #6 to #10 of FIG. 26 is carried out in parallel, and the units simultaneously apply data packets 432 storing the results of operations to the corresponding packet junction units of the junction unit 304. Program storing unit 220 simultaneously reads the next plurality of program data (all program data stored in cluster n+1) and sequentially applies the read program data to the corresponding packet junction units of the junction unit 304 in accordance with address designation based on the destination intra-cluster identification number (n+1) stored in the packet 520, though not shown in FIG. 25.

Thereafter, the packets flow a packet path of junction unit 304, paired data detecting unit 308, branch unit 306, operation unit 302 . . . to be sequentially processed, and thus instructions of nodes #11 to #15 shown in FIG. 26 are processed in parallel.

As described above, as a plurality of packets circulate through a packet path simultaneously, and each of the plurality of program data read per one access from the program storing unit 220 is simultaneously and individually processed. Therefore, the process rate in executing the data flow program 550 stored in program storing unit 220 can be improved in proportion to the amount of program data (in this example, 5) read per one access at most, as compared with the prior art.

As described above, according to the second embodiment, a large amount of program data can be read in parallel by simply accessing once the program storing unit 220 in the data driven type information processor, and efficiency of accessing to program storing unit can be improved as compared with the prior art. In addition, since improvement of memory access efficiency mentioned above is not realized by using memories allowing high speed accessing in the program storing unit, it does not lead to increased cost of the processor. Further, the amount of program data read by one access of program storing unit can be changed as desired, dependent on the number of division of the data flow program to be executed in the processor in the groups of programs in the program storing unit and on the content of destination information.

Since information processing of each of the program data read from the program groups of the program storing units at one access can be carried out in parallel and independent from each other in the paired data detecting unit and in the operation processing unit, the speed of information processing in the data driven type information processor can be significantly improved as compared with the prior art.

A data driven type information processor in accordance with the third embodiment of the present invention will be described. The data driven type information processor of this embodiment is characterized in that a plurality of different type operation processing units for processing data in accordance with the types of instructions are provided at the operation unit.

Figure 27:
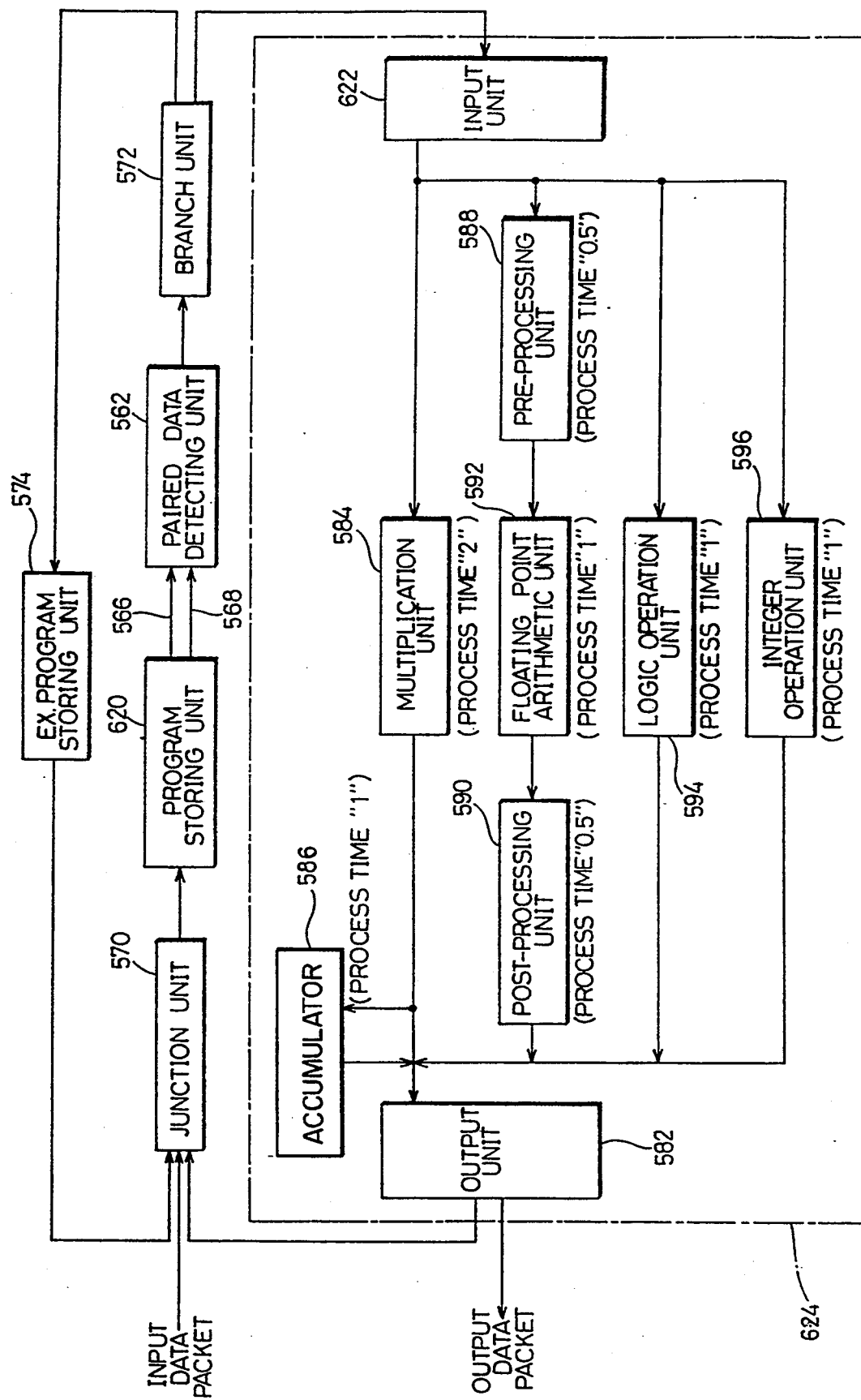
FIG. 27 is a block diagram of a data driven type image processor in accordance with a third embodiment of the present invention.

Referring to FIG. 27, the data driven type information processor in accordance with the third embodiment of the present invention includes a program storing unit 620, a paired data detecting unit 562, an operation processing unit 624, a junction unit 570, a branch unit 572 and an external program storing unit 574. Junction unit 570 is provided on the input side of program storing unit 620. Branch unit 570 is provided on the output side of paired data detecting unit 562. External program storing unit 574 is provided between the output of branch unit 572 and the input of junction unit 570. Junction unit 570 and branch unit 572 have packet buffering function.

External program storing unit 574 requires longer access time than program storing unit 620. However, it has a larger capacity than program storing unit 620, and it holds excessive data which cannot be processed by program storing unit 620. If memory capacity of program storing unit 620 is sufficiently large, external program storing unit 574 may not be provided.

Figure 28:
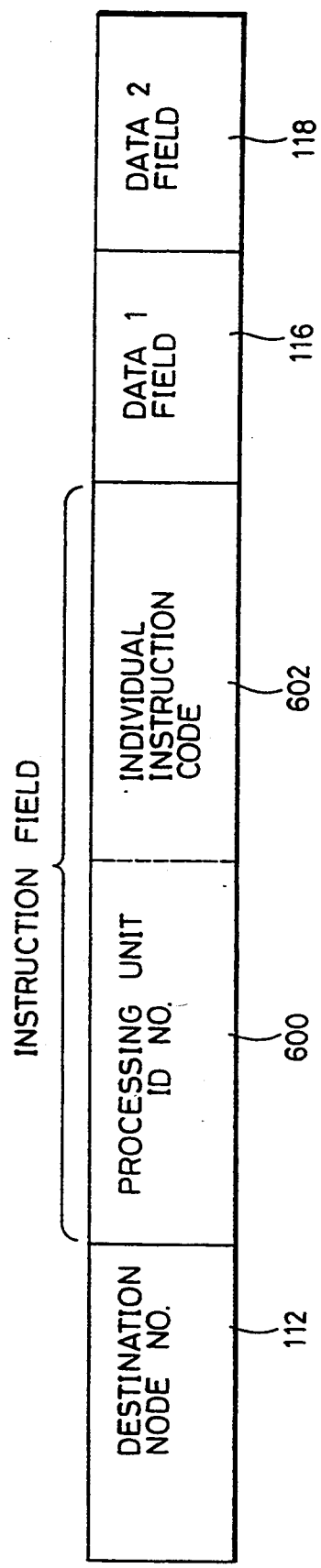
FIG. 28 shows a field structure of a data packet processed by the third embodiment.

Referring to FIG. 28, the data packet to be processed by the processor of the present embodiment includes a destination field, an instruction field, a data 1 field and a data 2 field. Destination field stores destination node number 112. Instruction field stores processing unit identifying number 600 and an individual instruction code 602. Data 1 field and data 2 field store operand data 116 and 118, respectively. Processing unit identifying number 600 designates a multiplication unit 584, a floating point arithmetic unit 592, an arithmetic logic unit 594 and an integer operation unit 596 of operation processing unit 564 which will be described later with reference to FIG. 27. For example, number 1 is allotted to multiplication unit 584, 2 is allotted to floating point arithmetic unit 592, 3 is allotted to arithmetic logic unit 594 and 4 is allotted to integer operation unit 596, respectively. Individual instruction code 602 specify an instruction executed by one of multiplication unit 584, floating point arithmetic unit 592, arithmetic logic unit 594 and integer operation unit 596 which is specified by the processing unit identifying number 600.

Figure 4:
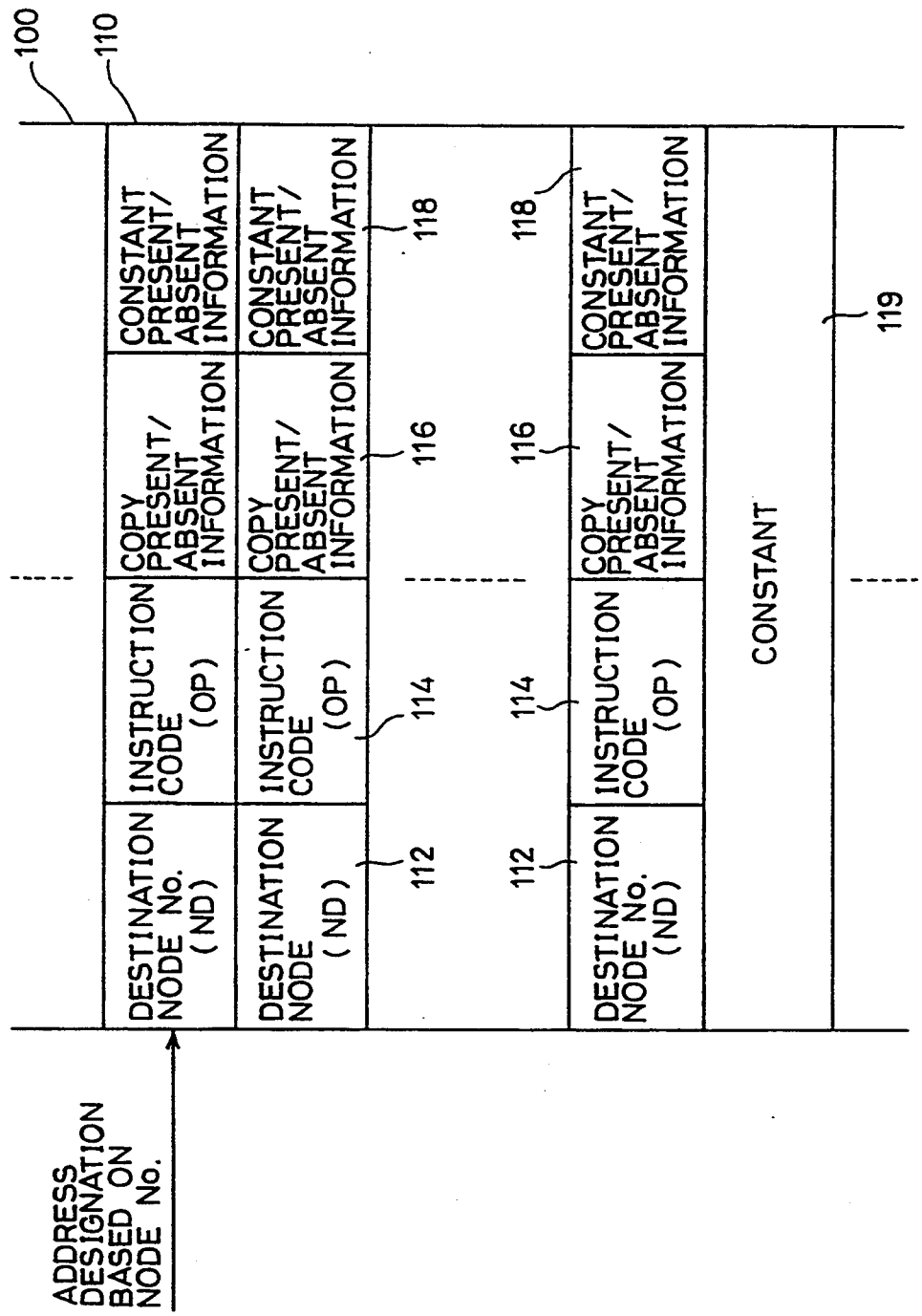
FIG. 4 shows a portion of a data flow program stored in the program storing unit of the data driven type information processor.
Figure 5:
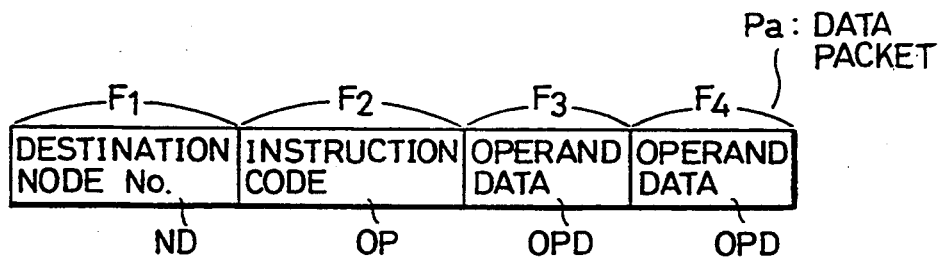
FIG. 5 shows a basic field structure of a conventional data packet processed by the data driven type information processor shown in FIG. 1.
Figure 7:
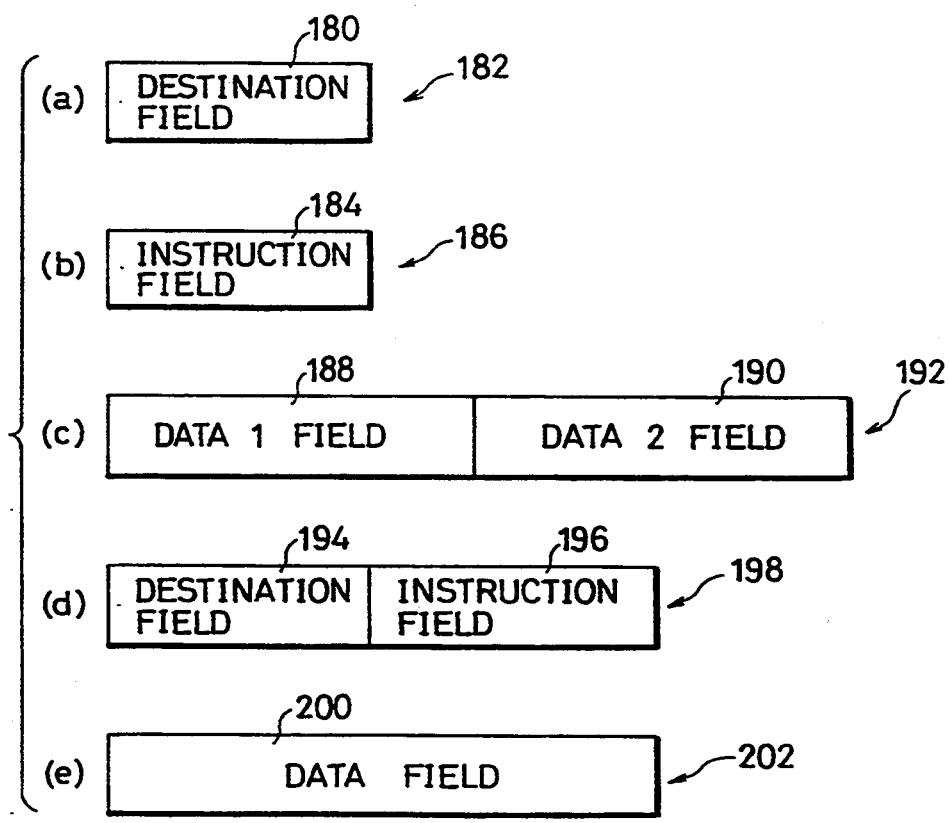
Figure 29:
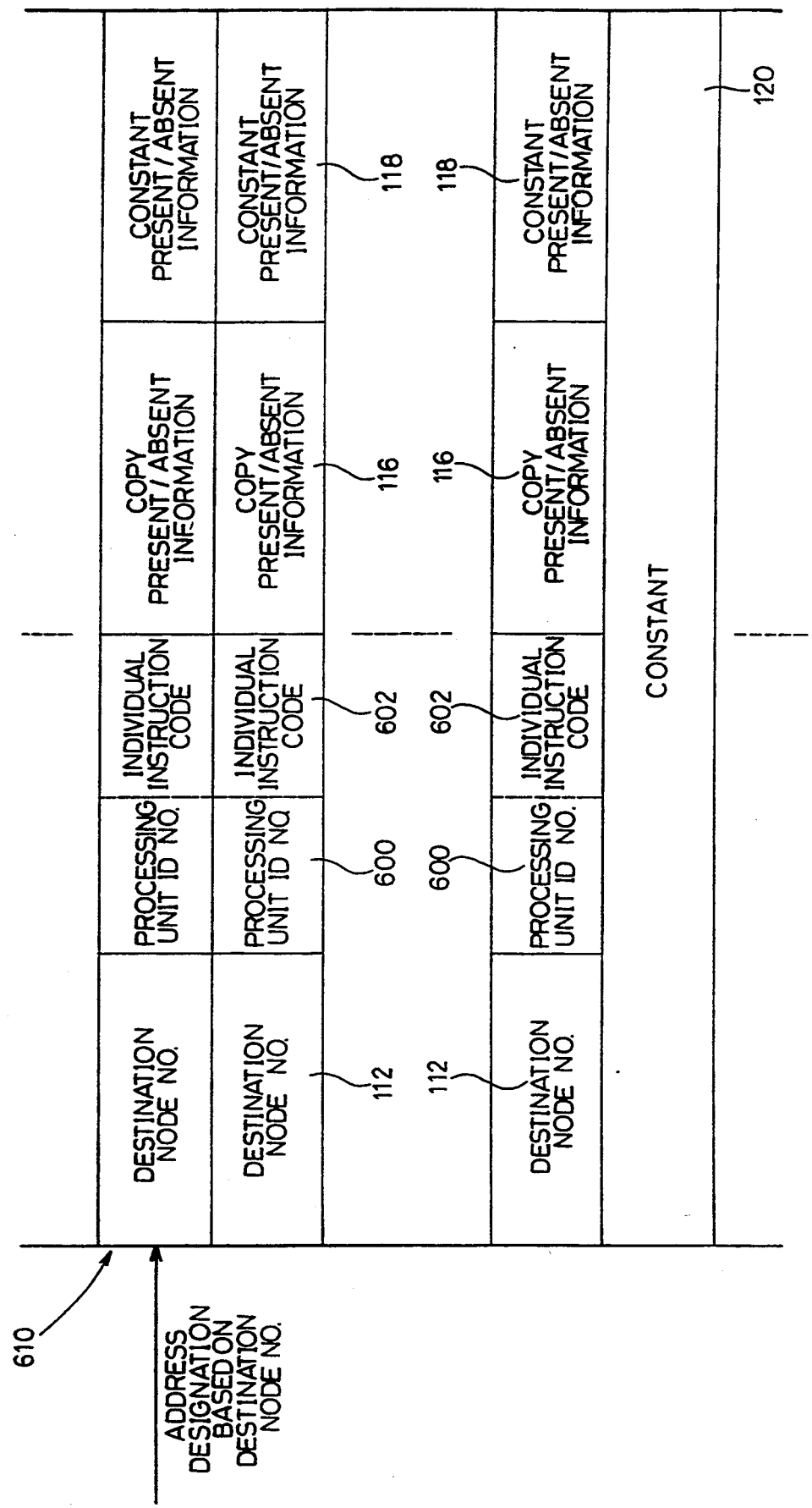
FIG. 29 shows a portion of a data flow program stored in the program storing unit of the data flow type image processor of FIG. 27.

Program storing unit 620 stores data flow program 610 shown in FIG. 29. Data flow program 610 of FIG. 29 differs from data flow program 110 of FIG. 4 in that instruction code is divided into processing unit identifying number 600 and an individual instruction code 602.

Program storing unit 620 reads destination node number 112, processing unit identification number 600, individual instruction code 602, copy present/absent information 116 and constant present/absent information 118 of data flow program 610 as shown in FIG. 29, by address designation based on destination node number of the received data packet. Program storing unit 620 stores destination node number 112, processing unit identification number 600 and individual instruction information 602 in the destination field and in the instruction field of the data packet, respectively, and outputs the data packet.

Figure 1:
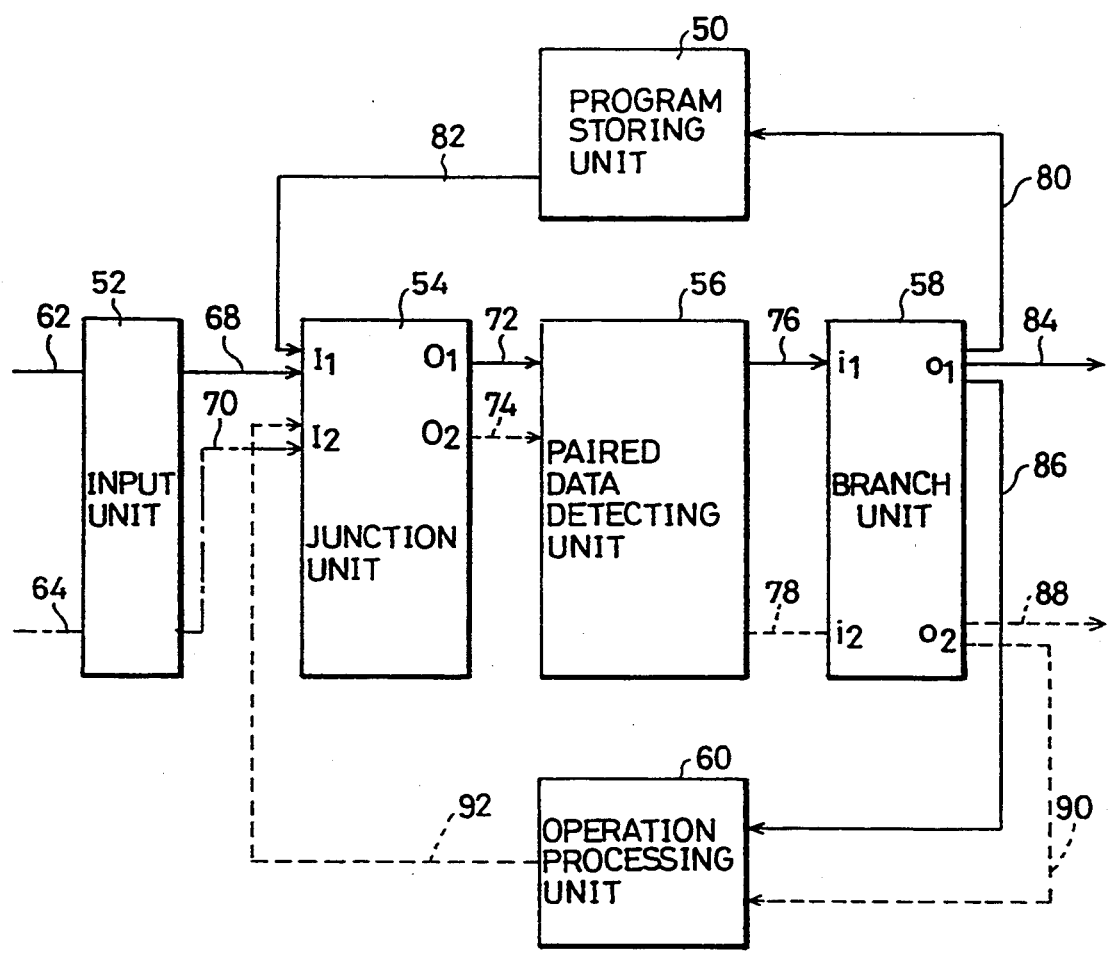
FIG. 1 is a block diagram showing a structure of a conventional data driven type information processor.
Figure 2:
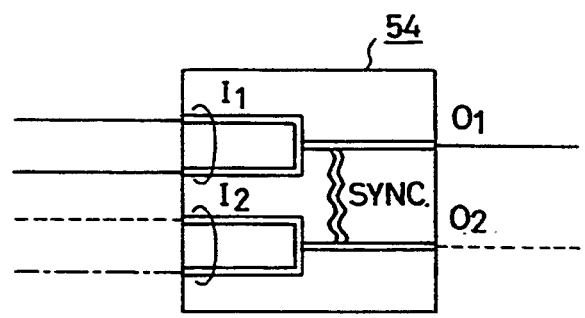
FIG. 2 shows a structure of a junction unit shown in FIG. 1.
Figure 3:
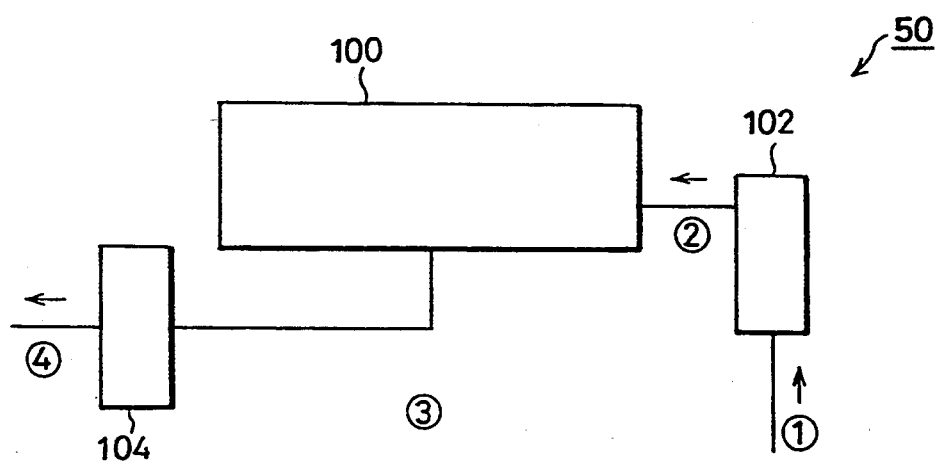
FIG. 3 shows a structure of a program storing unit shown in FIG. 1.

The structure and the operation of paired data detecting unit 562 is similar to the structure and operation of paired data detecting unit 50 shown in FIG. 1, and detailed description thereof is not repeated.

Operation processing unit 624 includes an input unit 622, an output unit 582, a multiplication unit 584, an accumulator 586, a pre-processing unit 588, a post-processing unit 590, a floating point arithmetic unit 592, arithmetic logic unit 594 and an integer operation unit 596. Floating point arithmetic unit 592, arithmetic logic unit 594 and integer operation unit 596 correspond to arithmetic logic unit 215 of FIG. 10 divided and arranged in parallel.

Input unit 622 has its input connected to an output of branch unit 572 and its output connected to inputs of multiplication unit 584, pre-processing unit 588, logic operation unit 594 and of integer operation unit 596. Multiplication unit 584 has its output connected to an input of accumulator 586 and to an input of output unit 582. Accumulator 586 has its output connected to an input of output unit 582. Pre-processing unit 588 has its output connected to an input of floating point arithmetic unit 592. Floating point arithmetic unit 592 has its output connected to an input of post processing unit 590. Post processing unit 598 has its output connected to an input of output unit 582. Logic operation unit 594 and integer operation unit 596 have their outputs connected to inputs of output unit 582. Output unit 582 has its output connected to an input of junction unit 570.

Input unit 622 transmits the received packet to operation unit or processing unit 584, 588, 594 or 596 corresponding to the processing unit identification number included in the data packet. Pre-processing unit 588 applies the received data packet to floating point arithmetic unit 592. Multiplication unit 584, floating point arithmetic unit 592, logic operation unit 594 and integer operation unit 596 carries out operation instruction with respect to the operand data, based on the applied individual instruction code, respectively.

By the above described structure, it becomes possible to process multiplication, floating point arithmetic operation, logic operation and integer operation all in parallel. Since accumulator 586 is connected in parallel with connection path of the output of multiplication unit 584 and the input of output unit 582, it becomes possible to apply only those results of multiplication which require accumulation to accumulator 586, while results of multiplication which do not require accumulation are applied to output unit 582 directly.

Referring to FIGS. 27 to 29, the data driven type information processor operating the following manner.

First, a data packet shown in FIG. 28 is applied to program storing unit 620 via junction unit 570. Program storing unit 620 accesses the data flow program 610 shown in FIG. 29 based on destination node number 112 included in the data packet, and outputs a data packet storing a processing unit identifying number 600 and individual instruction code 602. Paired data detecting unit 562 waits for a data packet including the same destination information out of the data packet from program storing unit 620 and if data packet having the same destination information are matched, converts the two data packets into one data packet and applies the same to branch unit 572. Paired data detecting unit 562 directly applies a data packet having one operand instruction to branch unit 572 without waiting for another data packet.

Paired data detecting unit 562 provides an identification tag indicating "not processed" on a data packet which exceeded the capacity of program storing unit 620 and output therefrom, and applies this data packet to branch unit 572. Branch unit 572 transmits the data packet having the identification tag of "not-processed" to an external program storing unit 574 for temporary storage. The data stored in external program storing unit 574 is again applied to program storing unit 620 to junction unit 570 to be processed.

Branch unit 570 applies data packet applied from paired data detecting unit 562 to input unit 620 of operation processing unit 624.

Input unit 622 outputs input data packet to the operation unit or processing unit corresponding to processing unit identifying number 600, based on the processing unit identification number 600 included in the received data packet. According to the aforementioned example, input unit 622 applies the data packet to multiplication unit 584, pre-processing unit 588, logic operation unit 594 and integer operation unit 596, when processing unit identification number 600 is "1", "2", "3" and "4", respectively.

Multiplication unit 584 processes the operand data included in the data packet in accordance with the individual instruction code included in the data packet. The result of multiplication by multiplication unit 584 is, when it does not require accumulation, directly to output unit 582, and if it requires accumulation, it is applied to accumulator 586. The result of processing by accumulator 586 is applied to the outside of the processor or to the input of junction unit 570 through output unit 582. Pre-processing unit 588 identifies that floating point operation is required based on the individual instruction code, and realigns the operand data. The realigned operand data is applied to floating point arithmetic unit 592, processed and then applied to post-processing unit 590. Post-processing unit 590 converts the result of operation to normalize floating point data and applies the same to output unit 582. Output unit 582 applies the normalized data to the outside of the processor or to the junction unit 570.

Logic operation unit 594 carries out logic operation in accordance with the individual instruction code included in the data packet. The result of operation is applied to output unit 582. Output unit 582 applies the data to the outside of the processor or to the junction unit 582.

Integer operation unit 596 carries out integer operation with respect to the operand in accordance with the individual instruction code included in the data packet, and applies the result of operation to output unit 582. Output unit 582 applies the result of integer operation to the other side of the processor or to junction unit 570.

Data packet applied to junction unit 570 is again processed through a passage from junction unit 570, program storing unit 620, paired data detecting unit 562, branch unit, and operation processing unit 624 or external program storing unit 574.

Packets output from each of the units 584, 586, 590, 594 and 596 of operation processing unit 624 are output from output unit 582 in a first-in, first-output manner. Since these operation units are connected in parallel, data packets can be processed in parallel, significantly reducing the time necessary for the operation processes.

Figure 10:
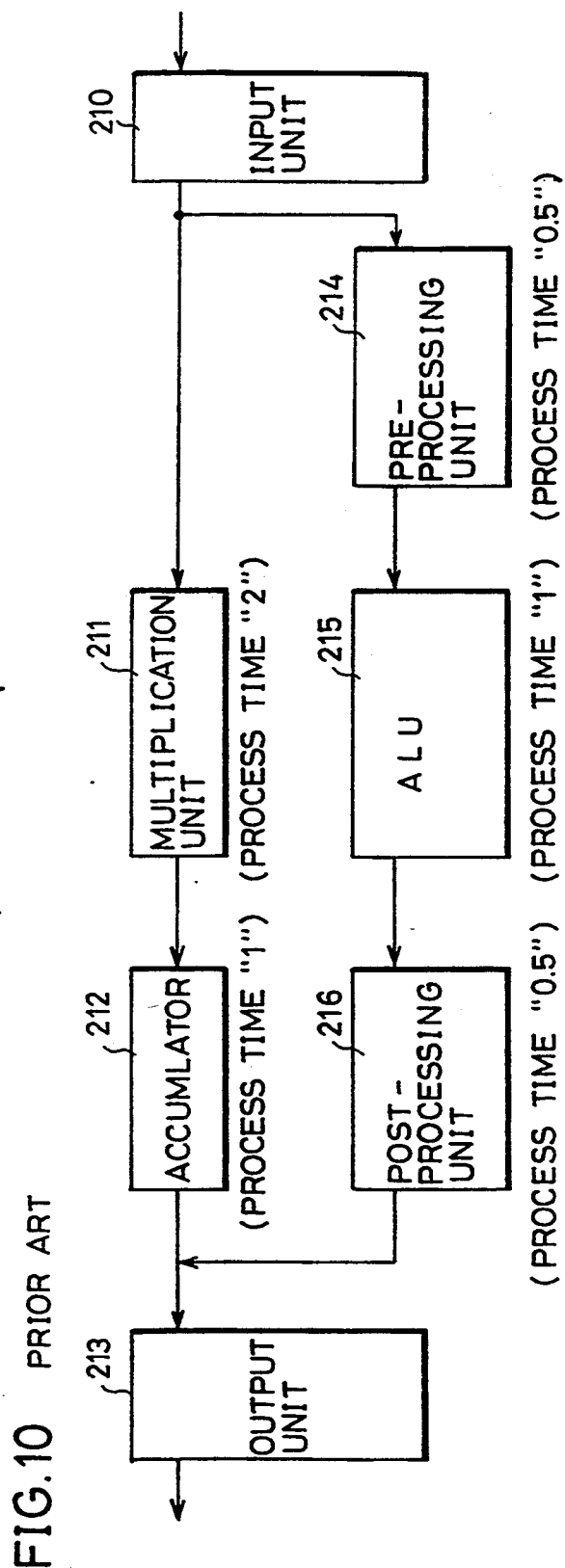
FIG. 10 is a block diagram showing a structure of a conventional operation processing unit.

Referring to FIG. 27, the time required for one operation in each of the units 584, 586, 590, 592, 594 and 596 are indicated, with general process time in the arithmetic logic unit of FIG. 10 (floating point arithmetic unit) logic operation unit and integer operation unit) being used as a reference unit "1". The process time of pre-processing unit 588, post-processing unit 590, multiplication unit 584 and accumulator 586 are "0.5", "2" and "1", respectively.

The process time reduced by this embodiment will be described with reference to FIGS. 27 and 10, taking a general example, worst example and the best example.

(1) As a general example, assume that the data packet is processed in the order of floating point operation, logic operation, multiplication and accumulation, and integer operation.

In the conventional example (FIG. 10), data packets except those requiring multiplication and accumulation pass through post-processing unit 588 and post-processing unit 590. Therefore, 2×"0.5"=1.0 is the necessary process time for passage. In order to carry out operation processing in accordance with the order mentioned above, process time "2" for floating point operation, process time "2" for logic operation, process time "3" for multiplication and accumulation, and process time "2" for integer operation are necessary, resulting in a total of "9" process time.

In this embodiment (FIG. 27), data packet passes through the pre-processing unit 20 and post-processing unit 21 only when floating point operation is necessary. When operation processing is carried out in the order mentioned above, the necessary process time is "2" for floating point operation, "1" for logic operation, "3" for multiplication and accumulation, and "1" for integer operation, that is, a total of "7". Therefore, efficiency in operation processing can be improved by about 1.24 as compared with the prior art.

(2) As a best example, assume that logic operation or integer operation are carried out four times continuously. In the prior art the necessary process time would be $4 \times "2" = "8"$.

In the present embodiment, the necessary process time is $4 \times "1" = "4"$. Therefore, the efficiency in operation processing is double that of the prior art.

(3) As a worst example, assume that multiplication and accumulation are carried out four times continuously.

In the prior art, the necessary process time would be $4 \times "3" = "12"$, while in the embodiment, the necessary process time is $4 \times "3" = "12"$. Therefore, even the in the worst example, the efficiency in operation processing is the same as the prior art.

As described above, according to this embodiment, even in the worst example, the efficiency in operation processing is not lower than the prior art, and in the best example, the efficiency in processing can be doubled.

As described above, according to this embodiment, data included in each packet data is applied only to the necessary operation processing unit and not passed through other processing units. Therefore, wasteful time required for passage of the data packet can be removed, and the time for operation processing can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processor for processing information in accordance with a data flow program, said processor comprising:

a program storing unit storing said data flow program in a number of memory banks wherein said number is greater than one, said data flow program including a series of program lines divided into a plurality of clusters, said memory banks storing said data flow program such that each program line of a cluster is stored in a different memory bank, each program line including at least destination information and instruction information, said destination information including at least a cluster identifier, said program storing unit responsive to a cluster identifier of received destination information for reading a cluster of program lines stored in said memory banks, and said program storing unit outputting an instruction data packet corresponding to each read program line, said instruction data packet including destination information and instruction information;

a junction unit producing merged data packets by merging instruction data packets output by said program storing unit with operand data packets, said operand data packets including operand information, thus, said merged data packets include destination information, instruction information, and operand information;

a paired data detecting unit merging merged data packets having destination information which satisfy a predetermined relationship;

a branch unit outputting destination information to said program storing unit based on data packets received from said paired data detecting unit, and outputting instruction information and operand information based on said data packets received from said paired data detecting unit; and an operation processing unit producing said operand data packets by processing operand information output by said branch unit in accordance with instruction information output by said branch unit.

2. The processor according to claim 1, wherein said operation processing unit comprises:

allotting means having an input and a plurality of outputs, said input connected to an output of said branch unit and receiving a data packet therefrom, said plurality of outputs for selectively outputting said received data packet based on instruction information included in said received data packet;

a plurality of operation means, each having an input connected to one of said outputs of said allotting means, for effectively executing individual specific instructions on operand information included in said received data packet; and result output means having an input connected to outputs of said plurality of operation means and an output connected to said junction unit, said result output means outputting, via its output, a result of said instructions executed by said plurality of operation means.

3. The processor according to claim 2, wherein least one of said plurality of operation means comprises:

means for executing specific pre-processing on said operand information, a specific operation means which properly executes instruction information of said received data packet only on said operand information pre-processed by said pre-processing means, and means for post-processing a result of operations performed by said specific operation means.

4. The processor according to claim 3, wherein said specific operation means includes floating point operation means, said pre-processing means includes means for realigning operand information for floating point operation, and said post-processing means includes means for normalizing a result of operations performed by said floating point operation means.

5. The processor according to claim 2, wherein at least one of said plurality of operation means includes first and second operation means for executing a series of operations, said second operation means being connected between an output of said first operation means and an input of said result output means, and said first operation means is also connected directly to said input of said result output means.

6. The processor according to claim 1, wherein said program storing unit further comprises:

a memory access unit receiving said destination information output by said branch unit, and causing said memory banks to successively output program lines in a cluster based on said cluster identifier of said destination information output by said branch unit; and a packet generating unit forming and outputting an instruction data packet for each program line output by said memory banks.

7. The processor according to claim 6, wherein said packet generating unit generates and outputs an instruction data packet in a first-in, first-out manner for each program line output from said memory banks.

8. The processor according to claim 6, wherein said packet generating unit includes in said destination information of said instruction data packets an intra-cluster identifier which designates a one of said memory banks outputting said program line used to form an instruction data packet.

9. The processor according to claim 8, wherein said junction unit comprises:

at least said number of ports, each port having at least a first and second input, said first input connected to said program storing unit and said second input connected to said operation processing unit; and wherein said junction unit merges said instruction data packet received at a first input with an operand data packet received at a second input of a port to form said merged data packet.

10. The processor according to claim 8, wherein said junction unit includes at least said number of packet junctions, each packet junction having at least a first and second input port, said first input port receiving one of said instruction data packet and an external instruction data packet, and said second input port receiving one of said operand data packet and an external operand data packet, each packet junction merging a data packet received at said first input port with a data packet received at said second input port to form a merged data packet;

arbitration units corresponding to each memory bank for storing merged data packets and outputting a merged data packet having a lowest cluster identifier; and a destination switching unit corresponding to each packet junction, each destination switching unit receiving a merged data packet from its corresponding packet junction and outputting said merged data packet to an arbitration unit based on said intra-cluster identifier.

11. The processor according to claim 10, wherein said paired data detection unit includes at least said number of detecting unit, each detecting unit having an input connected to an output of one of said arbitration units, each detecting unit detecting a first and second merged data packet having cluster identifiers which are equal, and each detecting unit outputting a data packet including said destination information, said instruction information, and said operand information of said second merged data packet and said operand information of said first data packet.

12. The processor according to claim 11, wherein each detecting unit comprises:

storage means for storing merged data packets for which a merged data packet to be paired has not yet been detected;

computing means for computing an address based on said cluster identifier of said destination information of a merged data packet received from a corresponding one of said arbitration units;

determining means for determining if a merged data packet is stored at said address in said storage means; and output control means for storing said received merged data packet at said address in said storage means when said determining means determines that no merged data packet is stored at said address, and for producing a data packet when said determining means determines that a merged data packet is stored at said address, said data packet including said destination information, said instruction information, and said operand information of said received merged data packet and said operand information of said merged data packet stored at said address in said storage means.

13. The processor according to claim 12, wherein each detecting unit further comprises:

second determining means for determining if said instruction information of said received merged data packet includes a prescribed instruction; and wherein said computing means directly outputs said received merged data packet as said data packet when said instruction information includes said prescribed instruction.

14. The processor according to claim 1, wherein said paired data detecting unit includes a plurality of outputs from which data packets are output, each data packet including destination information, instruction information, and at least one operand information; and said branch unit includes, data packet switching means corresponding to each output of said paired data detecting unit, each data packet switching means including an input and a plurality of outputs, said input connected to one of said outputs of said paired data detecting unit and receiving a data packet, each data packet switching means for outputting at least said cluster identifier of said destination information of said received data packet to said program storing unit upon receipt of an enabling signal, and for outputting portions of said received data packet via prescribed ones of its outputs upon receipt of said enabling signal; and output control means connected to each data packet switch means, said output control means inputting said cluster identifier of said destination information of each received data packet, and for simultaneously sending said enabling signal to selected data packet switch means based on said input cluster identifiers.

15. The processor according to claim 14, wherein each data packet switch means comprises:

a packet input unit connected to one of said outputs of said paired data detecting unit and receiving a data packet, a cluster sort unit storing a predetermined number of data packets, and sorting said predetermined number of data packets and said received data packet, said cluster sort unit outputting one of said predetermined number of data packets and said received data packet with a lowest cluster identifier, and a destination arbitration unit for inputting said data packet output by said cluster sort unit, said destination arbitration unit outputting at least said cluster identifier of said destination information of said input data packet to said program storing unit upon receipt of an enabling signal, and for outputting portions of said input data packet via prescribed ones of its outputs upon receipt of said enabling signal; and said output control means compares said input cluster identifiers to determine a lowest cluster identifier, and sends said enabling signal to each of said destination arbitration units having a data packet with a cluster identifier equal to said determined lowest cluster identifier.

16. The processor according to claim 14, wherein said operation processing unit includes at least said number of operation units, each operation unit including an operation input and an operation output, said operation input connected to at least one of said outputs one of said data packet switch means, said operation output connected to said junction unit, each operation unit performing an operation on operand information received at said operation input in accordance with instruction information received at said operation output, and outputting a result of said operation via said operation output.

17. The processor according to claim 16, wherein said junction unit produces merged data packets by concatenating said operand data packets with said instruction data packets.

18. A data driven type information processor for processing information in accordance with a data flow program, said processor comprising:

a program storing unit storing said data flow program in a number of memory banks wherein said number is greater than one, said data flow program including a series of program lines divided into a plurality of clusters, said memory banks storing said data flow program such that each program line of a cluster is stored in a different memory bank, each program line including at least destination information and instruction information, said destination information including at least a cluster identifier, said program storing unit responsive to a cluster identifier of received destination information for reading a cluster of program lines stored in said memory banks, and said program storing unit outputting an instruction data packet corresponding to each read program line, said instruction data packet including destination information and instruction information;

a junction unit associating an operand data packet with one of said instruction data packets output by said program storing unit and outputting said instruction data packet and said operand data packet associated therewith, said operand data packets including operand information;

a paired data detecting unit receiving associated operand and instruction data packets, merging instruction data packets and merging operand data packets associated therewith when said merged instruction data packets have destination information which satisfies a predetermined relationship;

a branch unit outputting destination information to said program storing unit based on data packets received from said paired data detecting unit, and outputting instruction information and operand information based on said data packets received from said paired data detecting unit; and an operation processing unit producing said operand data packets by processing operand information output by said branch unit in accordance with instruction information output by said branch unit.

19. The processor according to claim 18, wherein said program storing unit further comprises:

a memory access unit receiving said destination information output by said branch unit, and causing said memory banks to successively output program lines in a cluster based on said cluster identifier of said destination information output by said branch unit; and a packet generating unit forming and outputting an instruction data packet for each program line output by said memory banks.

20. The processor according to claim 19, wherein said packet generating unit includes in said destination information of said instruction data packets an intra-cluster identifier which designates a one of said memory banks outputting said program line used to form an instruction data packet.

* * * * *